(12) United States Patent
Jacobs et al.

(10) Patent No.: US 12,300,854 B1
(45) Date of Patent: May 13, 2025

(54) OVERMOLDED CURRENT COLLECTOR ASSEMBLY

(71) Applicant: Rivian IP Holdings, LLC, Irvine, CA (US)

(72) Inventors: Tyler Jacobs, Hawthorne, CA (US); Eldon James Summerson, Omaha, NE (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/438,784

(22) Filed: Feb. 12, 2024

(51) Int. Cl.
| | |
|---|---|
| *H01M 50/521* | (2021.01) |
| *H01M 50/209* | (2021.01) |
| *H01M 50/249* | (2021.01) |
| *H01M 50/507* | (2021.01) |

(52) U.S. Cl.
CPC ....... *H01M 50/521* (2021.01); *H01M 50/209* (2021.01); *H01M 50/507* (2021.01); *H01M 50/249* (2021.01)

(58) Field of Classification Search
CPC .................................................. H01M 50/521
See application file for complete search history.

(56) References Cited

U.S. PATENT DOCUMENTS

| | | | |
|---|---|---|---|
| 9,147,875 B1 | 9/2015 | Coakley et al. | |
| 9,545,010 B2 | 1/2017 | Coakley et al. | |
| 9,844,148 B2 | 12/2017 | Coakley et al. | |
| 10,211,443 B2 | 2/2019 | Coakley et al. | |
| 10,964,931 B2 | 3/2021 | Coakley et al. | |
| 11,116,070 B2 | 9/2021 | Coakley et al. | |
| 11,894,580 B2 | 2/2024 | Coakley et al. | |
| 11,979,976 B2 | 5/2024 | Coakley et al. | |
| 12,035,459 B2 | 7/2024 | Coakley et al. | |
| 12,040,511 B2 | 7/2024 | Coakley et al. | |
| 2013/0337291 A1 | 12/2013 | Mayer et al. | |
| 2014/0154530 A1* | 6/2014 | Fujiwara | H01M 50/512 429/7 |
| 2019/0081308 A1* | 3/2019 | Capati | H01M 50/516 |
| 2019/0273243 A1* | 9/2019 | Motokawa | H01M 50/593 |
| 2021/0175588 A1 | 6/2021 | Coakley et al. | |
| 2023/0113945 A1* | 4/2023 | Jung | H01M 10/647 429/99 |
| 2023/0387498 A1* | 11/2023 | Wurden | H01M 50/358 |

* cited by examiner

*Primary Examiner* — Brian R Ohara

(74) *Attorney, Agent, or Firm* — Foley & Lardner LLP

(57) ABSTRACT

A current collector assembly (CCA) with an insulative structure is provided. A battery system can include the current collector assembly formed from the insulative structure. The current collector assembly can include a conductor layer at least partially encapsulated by the insulative structure. The current collector assembly can include a conductor array cut from the conductor layer. A first portion of the conductor array can contact a positive terminal of a first group of battery cells, and a second portion of the conductor array can contact a negative terminal of a second group of battery cells. The rib can be formed from the insulative structure of the current collector assembly.

18 Claims, 20 Drawing Sheets

OVERMOLDED CURRENT COLLECTOR ASSEMBLY

INTRODUCTION

Electric vehicles (EVs) can be powered using batteries that store energy to reduce greenhouse gas emissions. The batteries can include different components facilitating energy storage and distribution.

SUMMARY

This disclosure is generally directed to an insulative structure of a current collector assembly (CCA). A current collector assembly formed from multiple pieces of plastic can consume excessive materials, introduce additional manufacturing steps and duration of manufacturing, or impact the durability or longevity of the current collector assembly when used in a battery system that can support a physical load. Aspects of this technical solution can provide an insulative structure of a CCA that can improve the ability to scale manufacturing of CCAs, while resulting in a CCA with increased durability, longevity, or ability to be used in load-bearing applications. For example, using an insulative structure allows for the CCA to contain a single conductor layer at least partially encapsulated by the insulative structure. A conductor array of the conductor layer can include one portion of the CCA that can contact a positive terminal of a group of battery cells and another portion of the CCA that can contact a negative terminal of another group of cells. The insulative structure can have a rib formed on the insulative structure of the CCA.

An aspect of this disclosure can be directed to a battery system. The battery system can include a current collector assembly formed from an insulative structure. The current collector assembly can include a conductor layer at least partially encapsulated by the insulative structure. The current collector assembly can include a conductor array cut from the conductor. A first portion of the conductor array can contact a positive terminal of a first group of battery cells, and a second portion of the conductor array can contact a negative terminal of a second group of battery cells. The rib can be formed on the insulative structure of the current collector assembly.

An aspect of this disclosure can be directed to a method for creating a battery system. The method can include forming a current collector assembly from an insulative structure. The method can include at least partially encapsulating a conductor layer within the insulative structure. The method can include cutting, a conductor array of the conductor layer. A first portion of the conductor array can contact a positive terminal of a first group of battery cells and a second portion of the conductor array can contact a negative terminal of a second group of battery cells. The method can include forming a rib on the insulative structure of the current collector assembly. The rib can be formed on the insulative structure of the current collector assembly.

An aspect of this disclosure can be directed to an electric vehicle. The electric vehicle includes a battery system. The battery system can include a current collector assembly formed from an insulative structure. The current collector assembly can include a conductor layer at least partially encapsulated by the insulative structure. The current collector assembly can include a conductor array cut from the conductor layer. A first portion of the conductor array can contact a positive terminal of a first group of battery cells, and a second portion of the conductor array can contact a negative terminal of a second group of battery cells. The rib can be formed from the insulative structure of the current collector assembly.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of, methods, apparatuses, and systems of integrating a current collector into a battery module assembly of an electric vehicle. The various concepts introduced above and discussed in greater detail below can be implemented in any of numerous ways.

This disclosure is generally directed to an insulative structure of a current collector assembly (CCA). A current collector assembly formed from multiple pieces can consume excessive materials, introduce additional manufacturing steps and duration of manufacturing, or impact the durability or longevity of the current collector assembly when used in a battery system that can support a physical load. Aspects of this technical solution can provide an insulative structure that can improve the ability to scale manufacturing of CCAs, while resulting in a CCA with increased durability, longevity, or ability to be used in load-bearing applications. For example, using an insulative structure in the CCA allows for the CCA to contain a single conductor layer. A conductor array can be stamped onto the conductor layer on one side of the insulative structure such that one portion of the CCA can contact a positive terminal of a group of battery cells, and another portion of the CCA can contact a negative terminal of another group of cells. The insulative structure can have a rib formed to separate portions of the CCA.

This disclosure is generally directed to a solution for producing a current collector assembly for efficient manufacturing in high volume with a scalable process for integration of a current collector assembly with a battery system of an EV (e.g., an assembly of a battery pack or a module). An EV can store energy in a battery pack and can include interconnected battery modules. The battery pack or the battery modules can include battery cells which can be charged and discharged via current collectors of the battery modules. However, manufacturing and integrating current collectors into a battery assembly can be difficult and time consuming.

The present solution of this disclosure is generally directed to an insulative structure for a current collector assembly (CCA). The insulative structure of this disclosure can allow for the CCA's to be produced in high volume and create a scalable process. For example, using an insulative structure allows for the CCA to contain a single conductor layer removed from the polymeric or plastic insulative structure. A conductor array can be cut onto the conductor layer such that one portion of the CCA can contact a positive terminal of a group of battery cells, and another portion of the CCA can contact a negative terminal of another group of cells. The insulative structure can have a rib formed to separate portions of the CCA.

Figure 1:
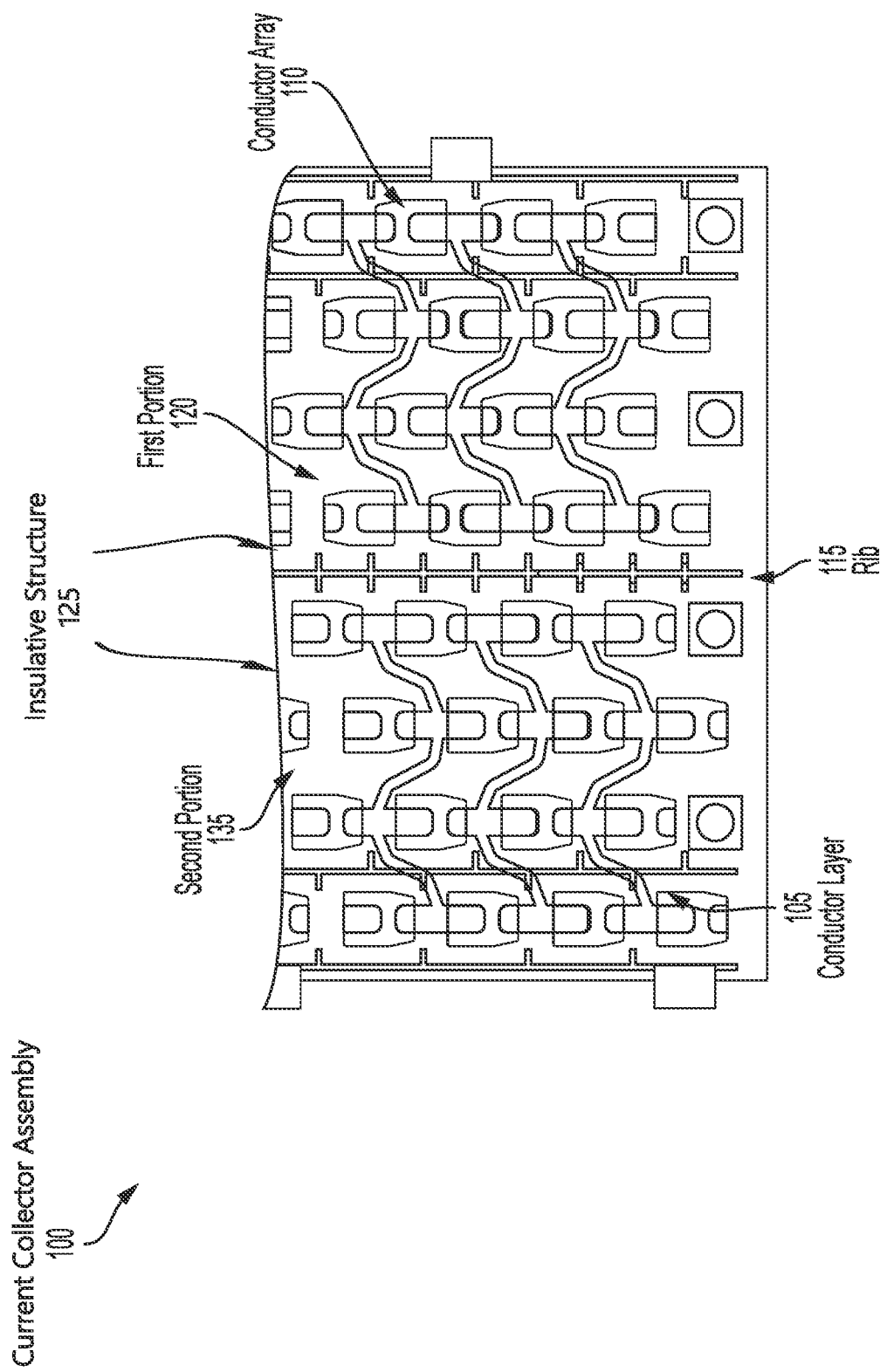
FIG. 1 depicts a top view of a current collector assembly.

FIG. 1 depicts an example current collector assembly 100, in accordance with implementations of this disclosure. The current collector assembly 100 can include one or more of a conductor layer 105, a conductor array 110, a rib 115, a first portion 120, an insulative structure 125, or a second portion 135. The currently collector assembly 100 can include an insulative structure 125. The current collector assembly 100 can be formed from an insulative structure 125. The insulative structure 125 can include plastic (e.g., thermoplastic material or thermoset material). The insulative structure 125 can encapsulate the current collector assembly in a manner that reduces manufacturing complexity, manufacturing resources, materials, or time to manufacture. This technology can provide a current collector assembly 100 with fewer components or pieces, while maintaining or improving functionality or structural integrity of the current collector. For example, the insulative structure 125 can be an overmold, which can reduce part assembly cost and part assembly sequences. The overmold of insulative structure 125 material can interface with one or more components of a battery system. Furthermore, the overmold of the insulative structure 125 can attenuate a frequency of vibration to constrain movement of the current collector assembly 100. For example, using the overmold, the currently collector assembly 100 can have a frequency closer to the fundamental frequency when a force is applied on both sides of current collector assembly 100, along a x-axis or a y-axis, to restrict the current collector assembly 100 from bending, twisting, and moving.

The current collector assembly 100 can include a conductor layer 105. The conductor layer 105 can include a material to conduct electricity (e.g., gold, copper, aluminum, silver, or a combination of metallic metals). The materials of the conductor layer 105 can be designed, constructed, or selected to conduct electricity. For example, the materials of the conductor layer 105 can have a sufficient density of free electrons to allow for the transmission of electric current to provide power to one or more component of an electric vehicle, such as an electric motor or on-board computer system. The conductor can be formed by depositing the material onto a substrate following a process including at least one of physical vapor deposition, chemical vapor deposition, electroplating, chemical deposition, among others. The conductor layer 105 can provide an electrically conductive path for electricity to and from battery cells that can be housed within a battery module. Instead of injecting the conductor layer 105 into the insulative structure 125, the conductor layer 105 can be partially encapsulated by the insulative structure 125. The insulative structure 125 can encapsulate the conductor layer 105 by at least partially surrounding the conductor layer 105, at least partially covering the conductor layer 105, or at least partially enveloping the conductor layer 105, for example. By partially encapsulating the conductor layer 105, one or more terminals can be exposed at the top portion of the current collector assembly 100. The conductor layer 105 can be coupled to the insulative structure 125 using an adhesive (e.g., glue). In some arrangements, the adhesive can be removed to separate the conductor layer 105 and the insulative structure 125.

The conductor layer 105 can include a plurality of polygons or quadrilaterals (e.g., square, rhombus, or parallelograms) to form spaces for the battery cells. For example, the spaces for the battery cells can be a plurality of squares. In another example, the spaces of the battery cells can be a plurality of rhombi. The plurality of polygons or quadrilaterals can include a symmetrical or asymmetrical arrangement. For example, one space can be offset by 3 centimeters and at a 45-degree angle from the space adjacent to it. In some arrangements, each space can be aligned along a first axis.

The current collector assembly 100 can include a conductor array 110. The conductor array 110 can include a pattern of conductive materials on the substrate. The pattern of conductive materials can facilitate the flow of electrical current based on the conductor layer 105. In some arrangements, the conductor array 110 can detect, identify, or facilitate measuring changes in temperature, current, or voltage and provide the changes to a voltage sensing harness. The conductor array 110 can be stamped in the insulative structure 125 to connect to one or more battery cells. The conductor array 110 can be cut from the conductor layer 105. The first portion 120 of the conductor array 110 can refer to or include a portion of the conductor array 110 that contacts a positive terminal of a first group of battery cells. The second portion 135 of the conductor array 110 can refer to or include a portion of the conductor array 110 that contacts a negative terminal of a second group of battery cells. In some cases, the first portion 120 can contact a negative terminal, while the second portion 135 contacts the positive terminal. The insulative structure 125 can allow the conductor array 110 to maintain connection with each battery cell despite being stamped in some portions of the insulative structure 125. The conductor array 110 can be stamped in the conductor layer 105 by a stamping tool (e.g., etching, copper foil stamping dies, conductive ink stamps, or circuit stamping dies).

The current collector assembly 100 can include a rib 115. The rib 115 can be formed from the insulative structure 125 on a side of the of the insulative structure 125. The rib 115 can be a raised or elevated ridge or strip of material (e.g., same material as the insulative structure 125 material, such as a polymeric or plastic). The rib 115 can provide structural support to the current collector assembly 100 by providing strength and rigidity. The rib 115 can distribute mechanical loads and prevent warping, bending, folding, or distorting of the insulative structure 125. For example, a physical load can be placed on the current collector assembly 100. The rib 115 can be in contact with at least a portion of the physical load and support the physical load. For example, the physical load can exert a force on the current collector assembly 100, which the rib 115 can receive and distribute to balance or at least partially support the physical load.

The rib 115 can adjust to a plurality of heights for the first and second group of battery cells. For example, the first group of battery cells can have a height between three to five inches to properly arrange the battery cells which can have a height between six to ten inches. The rib 115 can include a pattern to interact with at least one of every cell or every couple of cells in the first group battery cells and the second group of battery cells. Furthermore, the rib 115 can extend along the entire dimension of the insulative structure 125.

A first side of the insulative structure 125 can include the conductor array 110, the rib 115, the first portion 120, the second portion 135, brackets, edge holes, and holes. The first side of the insulative structure 125 can be formed to withstand a physical load that can cause warping, bending, or distorting of the insulative structure 125. For example, a physical load can be place on the first side of the insulative structure 125 of the insulative structure 125. The first side of the insulative structure 125 can interface with at least a portion of the physical load. Furthermore, the physical load can exert a force (e.g., force of gravity) on the first side of the insulative structure 125. The first side of the insulative structure 125 can protect, guard, or prevent damages to the components within the current collector assembly 100. For example, water may spill onto the current collector assembly 100 and the first side of the insulative structure 125 can drain the water by forcing the flow of water to an end of the first side of the insulative structure 125 125. In some arrangements, the first side of the insulative structure 125 can be formed to interface with the lid. For example, the lid can contain dimensions to operatively coupled to the first side of the insulative structure 125.

A second side of the insulative structure 125 can include the conductor layer 105, the conductor array 110, battery cells, a center spine, a flange, and a flame barrier. The second side of the insulative structure 125 can be opposite the first side of the insulative structure 125. The second side of the insulative structure 125 can aid in heat dissipation of the battery cells by including openings (e.g., cell spaces) and having a non-conductive material. In some arrangements, the second side of the insulative structure 125 can interact with the flame barrier. For example, the flame barrier can align with the second side of the insulative structure 125 based on the placement of the battery cells. Furthermore, the second side of the insulative structure 125 can align the battery cells to be coupled to the flame barrier and the second side of the insulative structure 125 with a tolerance.

Figure 2A:
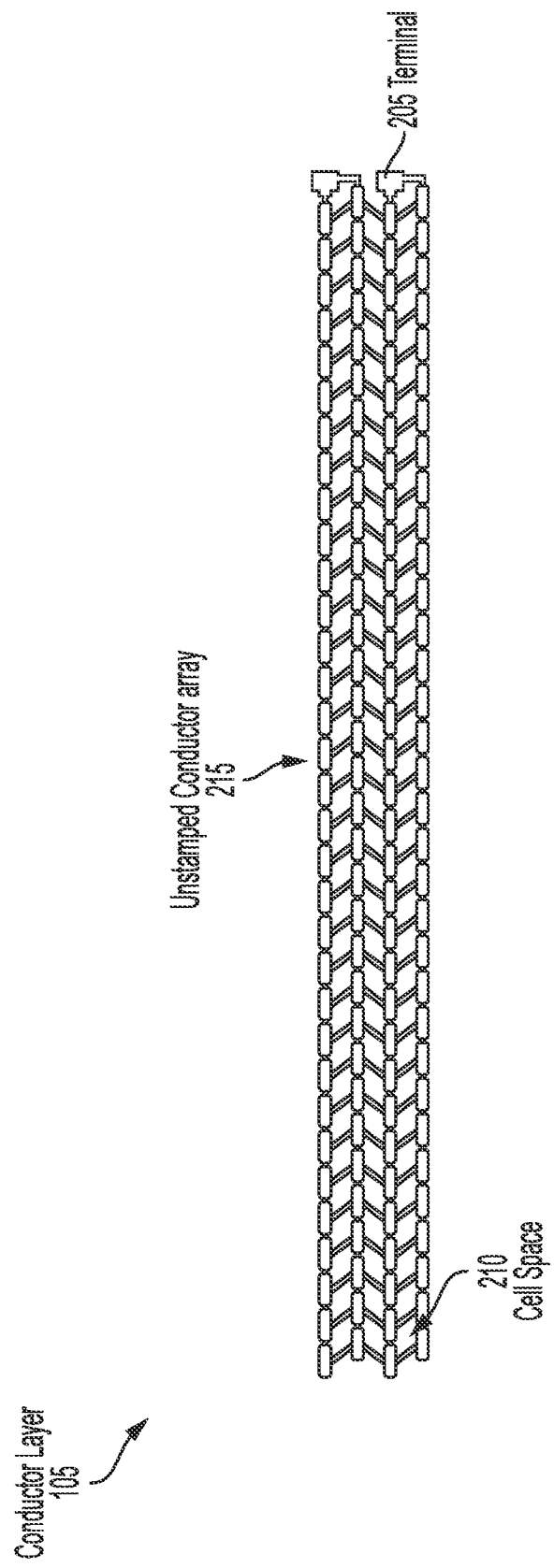
FIG. 2A depicts a top view of a conductor layer without a stamped conductor array.

FIG. 2A depicts an example of the conductor layer 105 in accordance with implementations. The view of the example conductor layer 105 depicted in FIG. 2A is represents the conductor layer 105 prior to a conductor array 215 being stamped. The conductor layer 105 can include the unstamped conductor array 215, multiple cell spaces 210, and one or more terminals 205 at one end of the conductor layer 105. Each cell space 210 can include dimensions to allow the battery cell to be held, placed, disposed or constrained within the cell space 210. The terminal 205 can be a connection point of contact for electrical components (e.g., conductors, resistors, battery cells, inductors, among others). The terminal 205 can include a negative terminal to be a reference point for voltages of the battery cells in the current collector assembly 100. The terminal 205 can include a positive terminal to enable a flow of current through the battery cells of the current collector assembly. The terminal 205 can be disposed, affixed or supported on the outer bottom surface of the current collector assembly 100. The terminal 205 can be disposed, affixed, or supported by the insulative structure 125 of the current collector assembly 100.

Figure 2B:
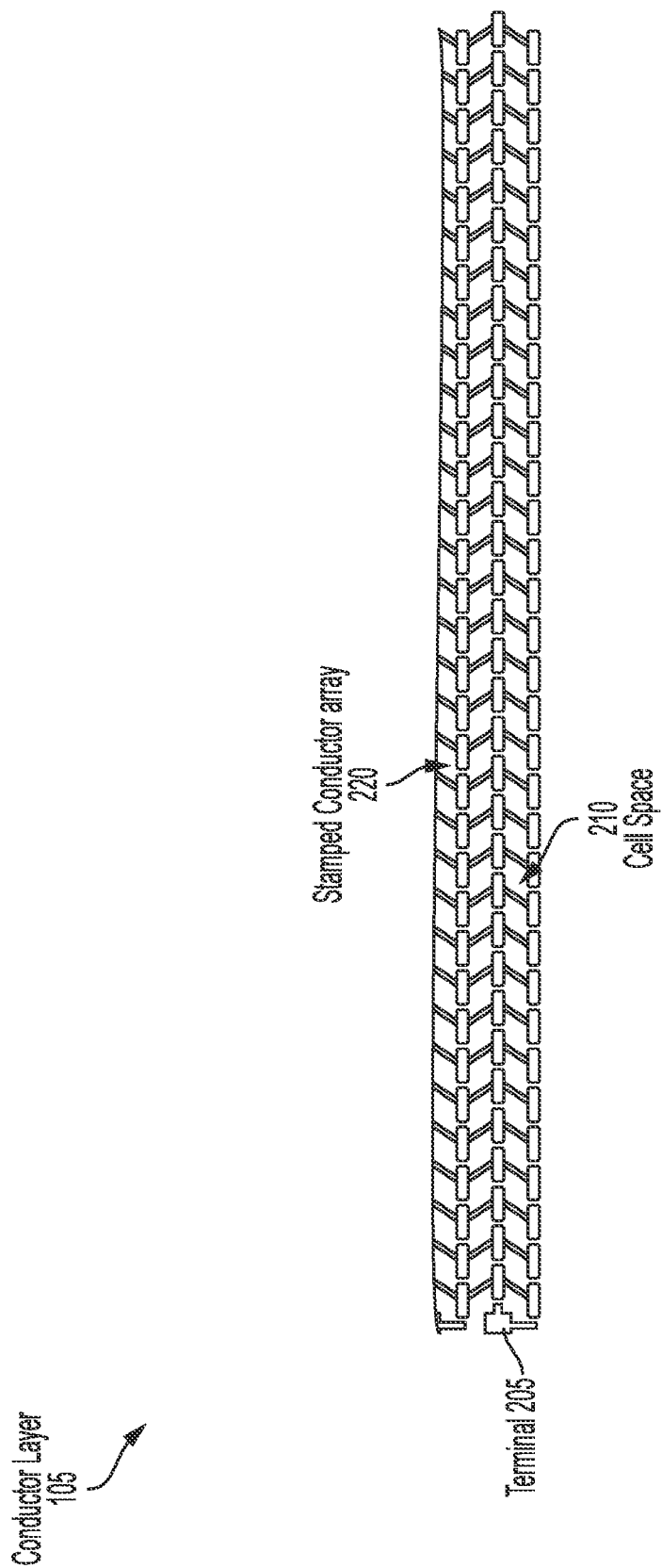
FIG. 2B depicts a top view of the conductor layer with a stamped conductor array.

FIG. 2B depicts an example conductor layer 105 that includes a stamped conductor array 220, in accordance with implementations. The stamped conductor array 220 can include one or more component, material, or functionality of the conductor array 110 depicted in FIG. 1.

Figure 3:
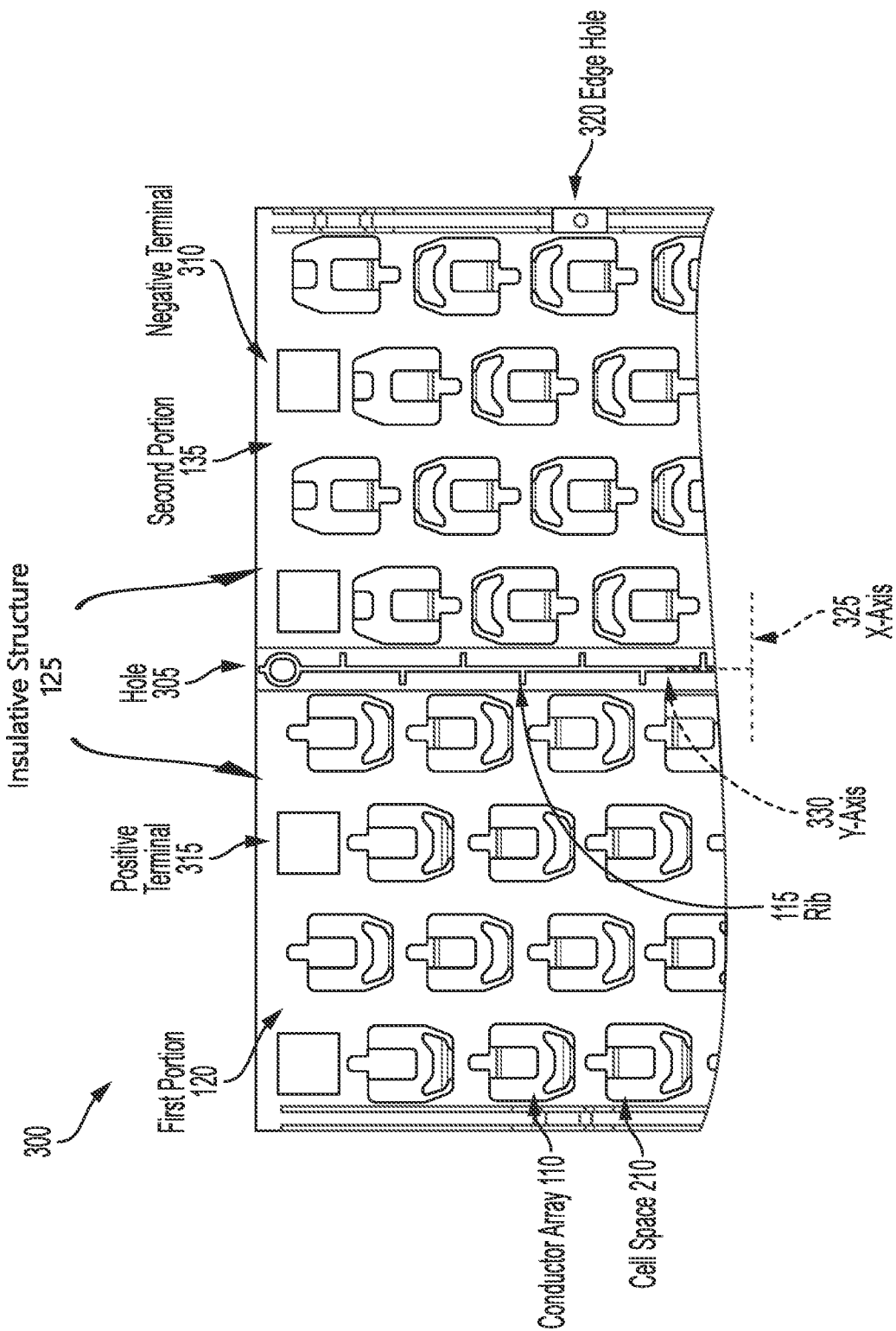
FIG. 3 depicts a top view of the current collector assembly.

FIG. 3 depicts an example current collector assembly 300, in accordance with implementations. The current collector assembly 300 can include one or more component, material or functionality of current collector assembly 100 depicted in FIG. 1. The current collector assembly 300 can include one or more of the conductor array 110, the rib 115, the first portion 120, the second portion 135, a hole 305, a negative terminal 310, a positive terminal 315, or an edge hole 320. The negative terminal 310 can refer to or include one or more component or functionality of the terminal 205 depicted in FIG. 2A. The positive terminal 315 can refer to or include one or more component or functionality of the terminal 205 depicted in FIG. 2A. The cell space 210 can be defined, established, or based on the current collector assembly 300. In some arrangements, the cell space 210 can be defined by the conductor layer 105.

The current collector assembly 300 can include one or more holes 305. The holes 305 can be referred to or include an opening or a cavity. The insulative structure 125 can form the one or more holes 305 to interact with a lid. The lid can be a covering made of the same plastic material as the insulative structure 125 structure or include one or more different materials. The lid can aide in heat dissipation from the battery cells. The lid can provide structural support for the current collector assembly. The holes 305 can be formed in a plurality of circular shapes (e.g., circle, oval, ellipse) and sizes defined by the insulative structure 125. For example, the size of the holes 305 can correspond and scale to a size of the insulative structure 125. The holes 305 can contain a first hole 305 including a first dimensionality. The first dimensionality can help align the battery system with the lid along a first axis (e.g., X-Axis 325, Y-Axis 330) different from a second dimensionality of a second hole 305 in the holes 305. The holes 305 can constrain the movement and rotation of the insulative structure 125 of the current collector assembly. For example, the holes 305 can allow the insulative structure 125 to move freely along the first axis (e.g., X-Axis 325, Y-Axis 330).

Each of the one or more holes 305 can be used as a two-way datum. In some arrangements, a datum can be a reference point to define the location of a plurality of materials, components, or functionality. In some arrangements, each of the one or more holes 305 can be used as a four-way datum. The two-way datum can prevent movement along a first axis (e.g., X-Axis 325, Y-Axis 330) on a plane. For example, one hole 305 can prevent movement along the X-Axis 325, where movement is free along the Y-Axis 330. In another example, one hole 305 can prevent movement along Y-Axis 330, where movement is free along the X-Axis 325. In some arrangements, each of the one or more holes 305 can be used as a four-way datum. The four-way datum can prevent movement along a first and second axis (e.g., +X-Axis 325, −X-Axis 325, +Y-Axis 330, −Y-Axis 330) on a plane. In some arrangements, the insulative structure 125 can include a cylindrical pin to determine the axis which may be constrained.

The insulative structure 125 can form an edge hole 320 coupled to an edge. The edge hole 320 can have different shapes (e.g., circle, oval, ellipse) and sizes. One edge hole 320 is depicted in FIG. 3, but the current collector assembly 100 can include a plurality of edge holes 302. Multiple edge holes 302 can interact with the lid of the current collector assembly 100. In some arrangements, the current collector assembly 100 can include a side wall to cover battery cells. In some arrangements, the edge hole 320 can constrain the movement and rotation of the insulative structure 125. In some arrangements, the edge hole 320 can have a depth corresponding to the height of the battery cells. The edge hole 320 can be a voltage harness routing grommet hole. In some arrangements, the edge hole 320 can support a voltage sense harness. For example, the edge hole 305 can be used to secure the voltage sense harness and limit the movement of the voltage sense harness within the current collector assembly 300.

The lid can be secured, fastened, or screwed into the edge hole 320 of the insulative structure 125. For example, the lid can contain one or more pins which extend the height of the battery cells of the current collector assembly 100. The pins can have dimensions corresponding to the edge hole 320 and can interact with the edge hole 320. The pins can be made of a material (e.g., steel, metal, plastic) to support a weight of the current collector assembly 100. The edge hole 320 and the hole 305 can constrain movement along a different axis. For example, the hole 305 can constrain the movement of the insulative structure 125 along the Y-axis 330, whereas the edge hole 320 can constrain the movement of the insulative structure 125 along the X-Axis 325. Each of the edge holes 320 and the holes 305 in the plurality of edge holes 320 and holes 305 can constrain movement along a different axis. For example, each of the holes 305 can constrain the movement of the insulative structure 125 along the Y-axis 330, whereas each of the edge hole 320 can constrain the movement of the insulative structure 125 along the X-Axis 325.

Edge hole 320 and the holes 305 can include a tolerance. The tolerance can be the same for the entire opening or different, based on direction or orientation. For example, tolerance of an opening in one direction can be different than the tolerance of the opening in another direction. For example, an edge hole 320 can include an opening having a first tolerance along a direction of length of the opening and a second tolerance along a direction of width of the opening. Tolerance can include any size range defined based on the size of the opening, such as between 1% and 20% of the size of the opening. For example, tolerance can have up to 1% of the opening size, 2% of the opening size, 5% of the opening size, 10% of the opening size, 15% of the opening size, 20% of the opening size or more than 20% of the opening size. Tolerance can include any size range based on the size of the pin cross-section diameter size, such as between 1-200% of the pin cross-section diameter size. For instance, tolerance can include 1%, 10%, 30%, 50%, 1100%, 11150%, 200% or more than 200% of the cross-sectional diameter size of pin. Tolerances can differ along the length and the width of the opening. Tolerances can differ along any direction with respect to the center of the opening. Tolerances can allow for the pin to move when inserted into the opening by one distance in one direction and by another distance in another direction.

Figure 4:
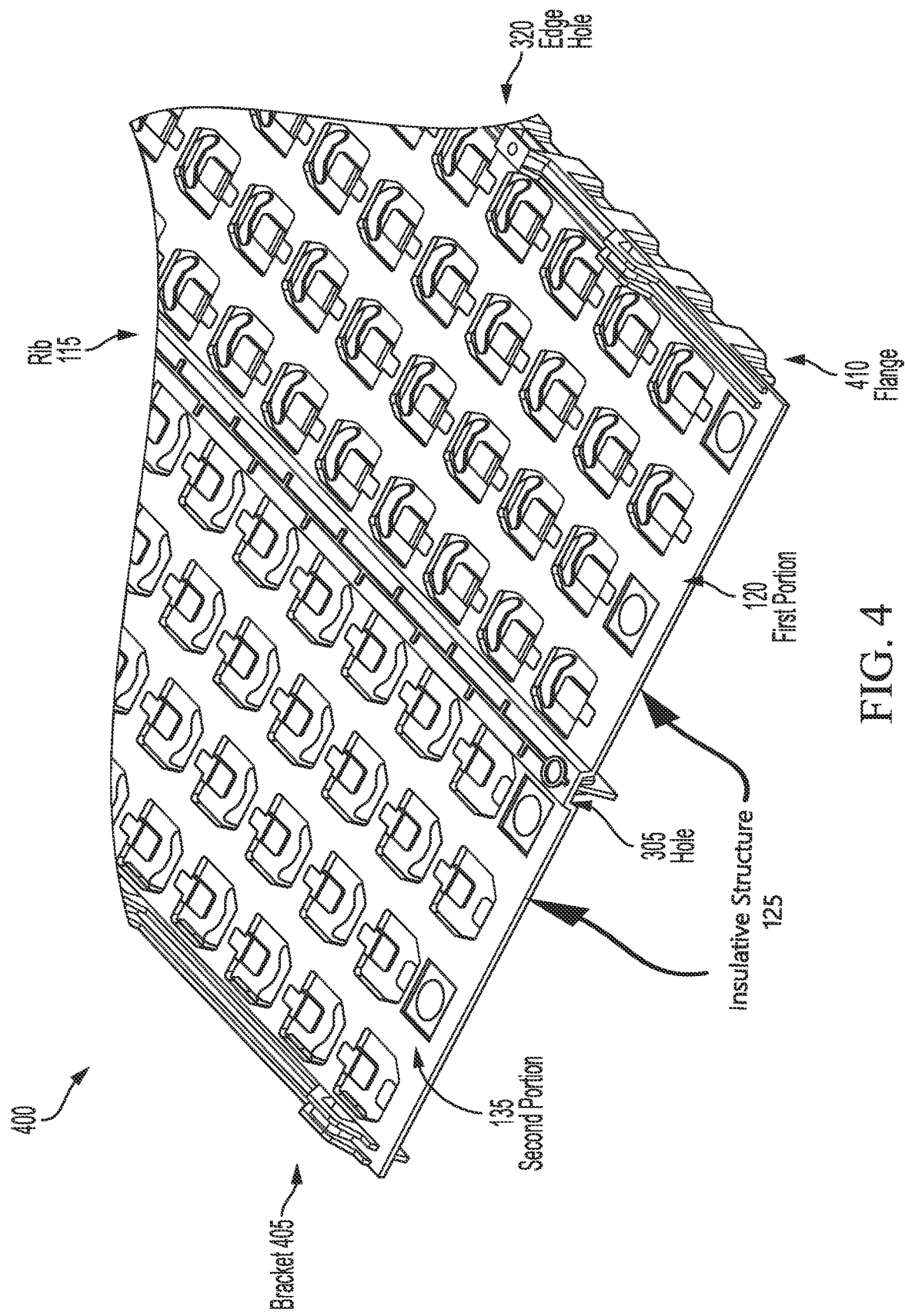
FIG. 4 depicts a rear-side view of the current collector assembly.
Figure 5:
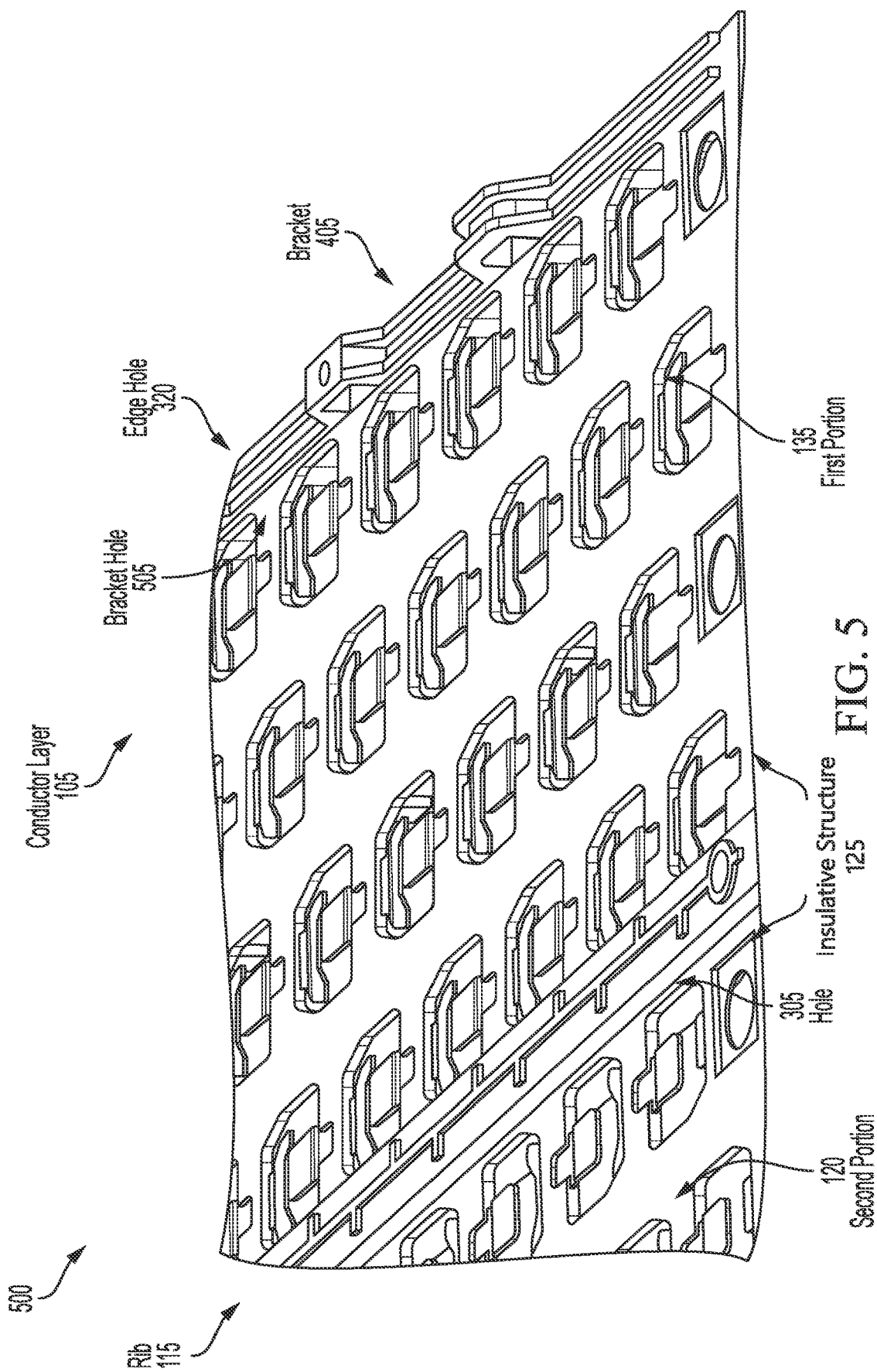
FIG. 5 depicts a rear-side view of the current collector assembly.
Figure 6:
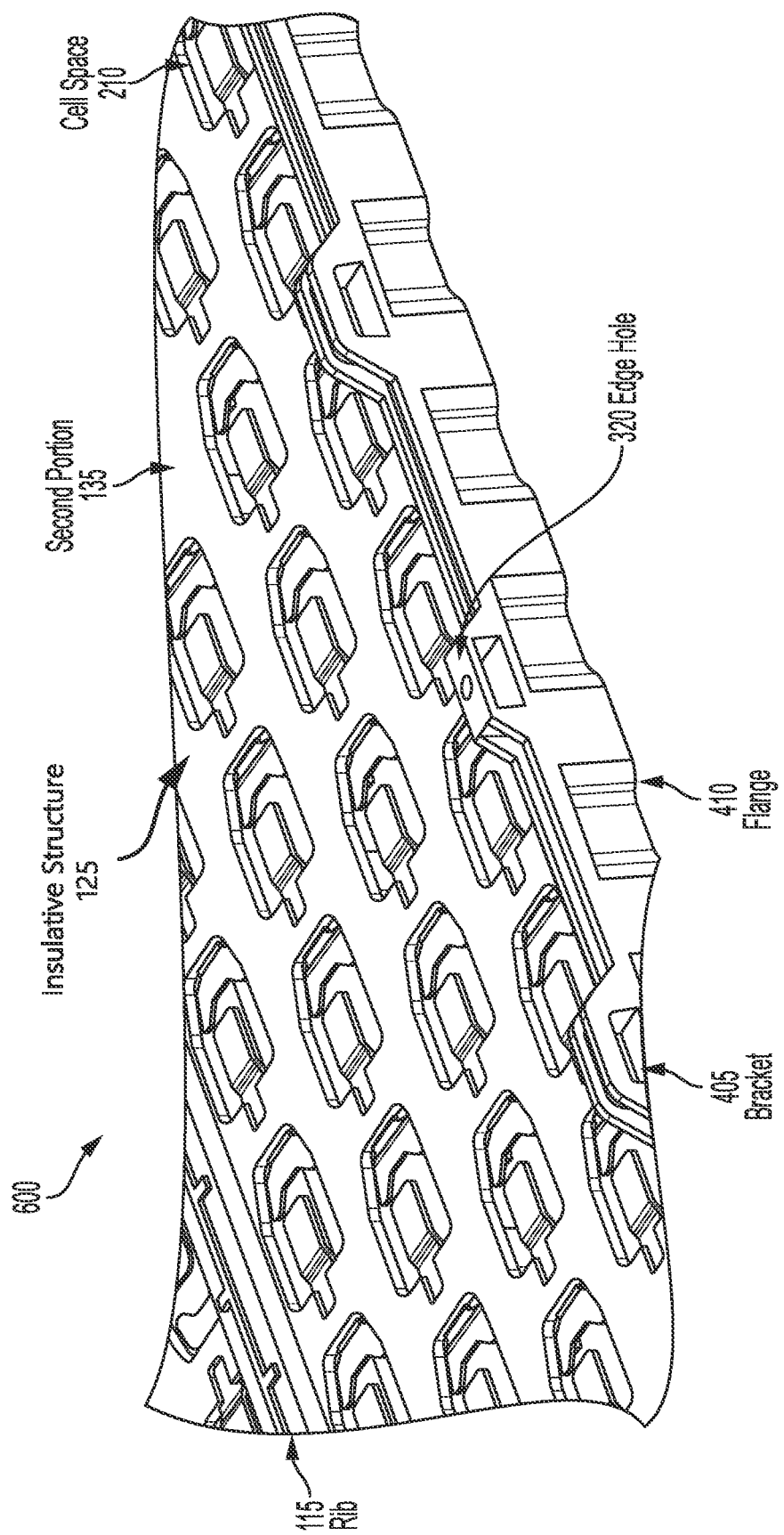
FIG. 6 depicts a rear-side view of the current collector assembly.

FIG. 4, FIG. 5, and FIG. 6 depict a current collector 400, 500, or 600 having multiple features in which a bracket 405 and a flange 410 of the insulative structure 100 can provide a structure for supporting the current collector assembly and other components (e.g., voltage sense harness or battery voltage tester). The current collector assembly 400 can include a plurality of brackets 405, depending upon the dimensions of the insulative structure 125. For example, an insulative structure 125 can have a length which requires a specific number of brackets 405. The bracket 405 can include a bracket hole 505 to allow objects (e.g., harness, metal, rope, structural components, etc.). For example, the bracket 405 can have an aluminum fastener fed through the bracket hole 505 to maintain the current collector assembly 400 at an elevated height. In another example, a harness can pass through the bracket hole 505 of the bracket 405 to attach a component to the current collector assembly 400. The bracket 405 can include the edge hole 302 to constrain the object fed through the bracket hole 505. In some arrangements, a harness can be fed through the bracket hole 505 and the pin from the lid can apply a downward force on the harness by extending through the edge hole 320. The bracket 405 can align the insulative structure 125 with other components (e.g., lid, metal) of the current collector assembly 400.

The flange 410 can provide structure support to the current collector assembly 400. The flange 410 can include a height adjustable to the battery cell size to protect the battery cells. For example, the flange 410 can have a height which extends to the height of the battery cells within the current collector assembly. The flange 410 can be formed from the materials of the insulative structure 125 defined by a use for the insulative structure 125. For example, the flange 410 can include a pattern to match an organization of the battery cells in the current collector assembly 400. The organization of the battery cells can correspond to other components (e.g., terminals, connectors, sensors, etc.) disposed throughout the current collector assembly 400. For example, the organization of the battery cells can correspond to a busbar coupled to the first portion 120 and the second portion 135, where the busbar is connected to a positive and negative terminal. The flange 410 can include a structural integrity to limit the free movement of the battery cells. For example, the pattern can be formed to allow the battery cells at the end of a row to have the battery cells movement restricted. The flange 410 can align the insulative structure 125 with one or more separator structures when loading the current collector assembly. The one or more separator structures can separate each battery cell in the plurality of battery cells in the current collector assembly 400.

Figure 7:
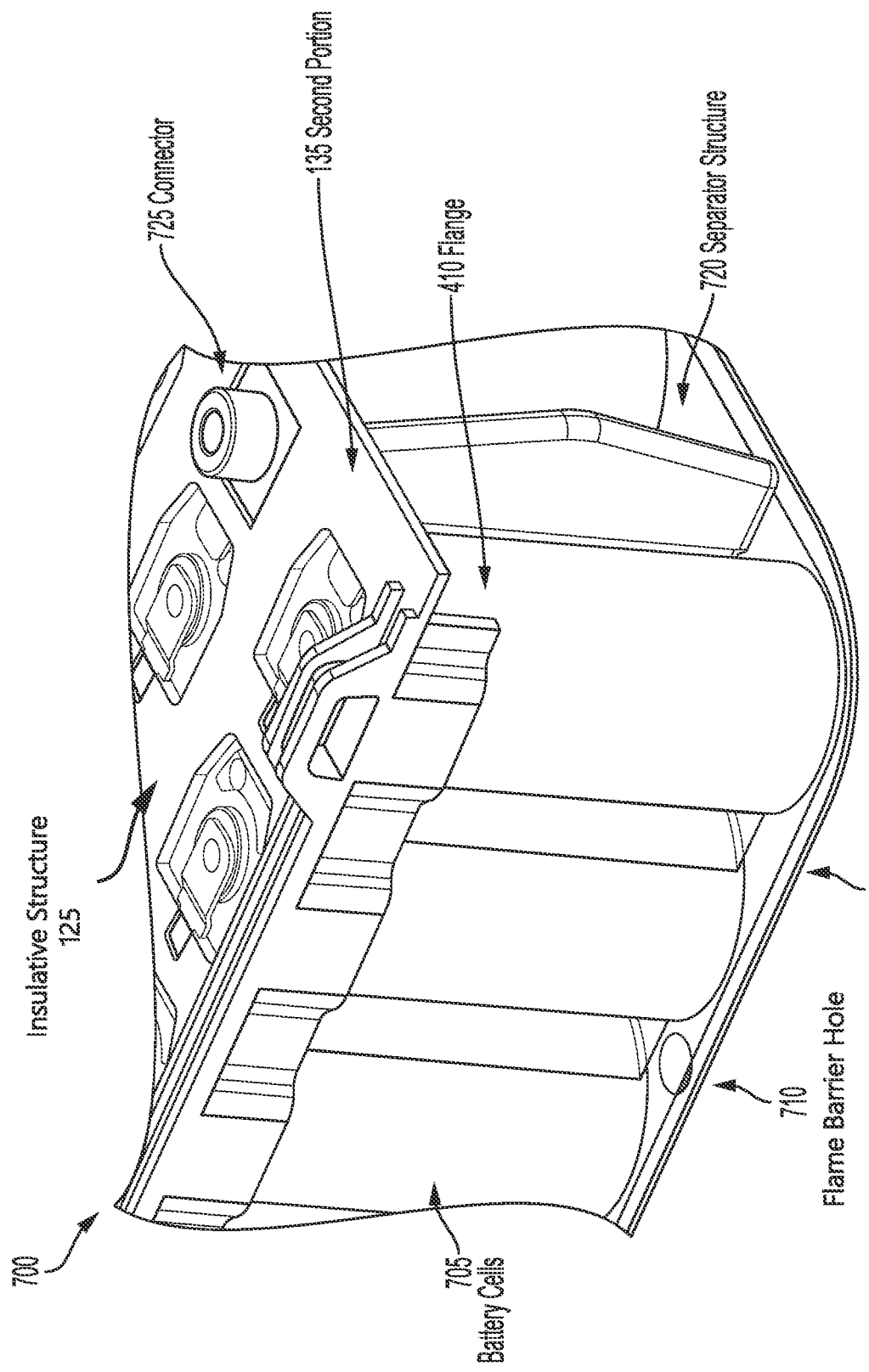
FIG. 7 depicts a side view of the current collector assembly.

FIG. 7 depicts a side view of an example current collector assembly 700. The current collector assembly 700 can include one or more component, material or functionality of the current collector assembly 100 depicted in FIG. 1. The current collector assembly 700 can include or interface with battery cells 705, flame barrier hole 710, flame barrier 715, a 720, or a connector 725. The connector 725 can be on the second portion 135 and the first portion 120. The connector 725 can be used to connect to negative terminal on the second portion 135. When connected to the negative terminal, current within the current collector assembly 700 can flow to the connector 725 to be grounded. The insulative structure 125 can provide the adequate dimensions for the connector 725 to attach to the negative terminal. Using the single piece of the insulative structure 125, an operation for removing the space for the insulative structure 125 can be more inefficient and inexpensive because of the ease of removing portions of the insulative structure 125. For example, if the connector 725 connects to the negative terminal, the battery cells on the second portion can be grounded. The connector 725 can be used to connect to the positive terminal on the first portion 120. When connected to the positive terminal, current can flow from the positive terminal to interact with each of the battery cells 705.

The flange 410 of the insulative structure 125 can interact with the flame barrier 715. In some arrangements, the flange 410 can locate where the battery cells 705 can be placed on the flame barrier 715. For example, the flange 410 can constrain the battery cells 705 to align the flame barrier 715. The flange 410 can be used to reduce error and maintain the tolerance. For example, the flange 410 can be used to constrain the battery cells 705 while the flame barrier 715 is aligned to maintain the tolerance necessary to construct the current collector assembly 100. The flange 410 can reduce error by constraining the battery cells 705, interacting with the flame barrier hole 710, and aligning the flame barrier 715 with the insulative structure 125. In some arrangements, the flange 410 can interact with the flame barrier hole 710 by allowing a securing mechanism (e.g., harness, fastener, rope, or metal) to attach to the flange 410 and constrain the flame barrier 715 to the insulative structure 125. Tightening the securing mechanism can decrease the free movement of components within the current collector assembly (e.g., battery cells 705, separator structure 720). In some arrangements, the flange 410 can be used to calibrate the current collector assembly 700. The calibration can include fastening the flange 410 and the battery cells 705, securing the flame barrier 715 to the flange 410 using a securing mechanism, or aligning the battery cells 705 to the flame barrier 715 by the flange 410.

The separator structure 720 can be coupled to the flame barrier 715 and the insulative structure 125. The separator structure 720 can include a battery separator material. The battery separator material can vary depending upon the type of battery (e.g., Lithium-Ion, Lead-Acid, Alkaline, Nickel-Cadmium, etc.) to improve safety and thermal resistance in some arrangements. The battery separator material can include a non-conductive material (e.g., polyethylene or polypropylene), material made from polyvinyl chloride, non-woven fabrics, glass fiber, among others). The separator structure 720 can be defined by the intended use of the battery, design requirements, or the type of battery. The separator structure 720 can have dimensions to correspond with the insulative structure 125 to allow for the separation of battery cells 705. The insulative structure 125 can include groves for the separator structure 720 to enter. The groves contain a shape to fit the separator structure 720 within a tolerance. For example, the groves can be within a 2% tolerance of the separator structure 720. The single piece of the insulative structure 125 enables the separator structure 720 to maintain the position as it is woven through the battery cells. The separator structure 720 can have a height to be constrained between the flame barrier 715 and the insulative structure 125.

Figure 8:
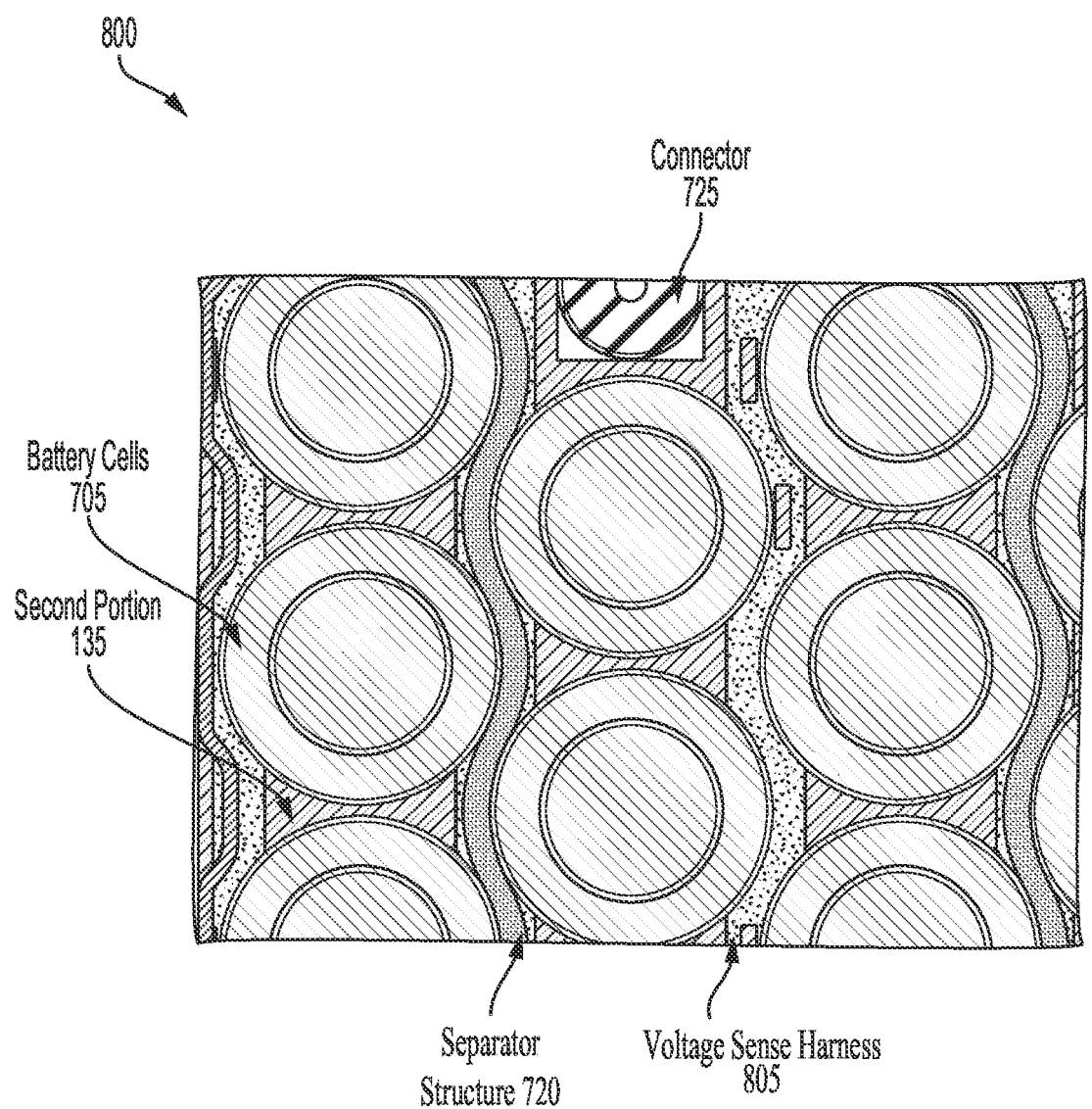
FIG. 8 depicts a bottom view of the current collector assembly.

FIG. 8 depicts a bottom view of an example current collector assembly 800. The current collector assembly 800 can include one or more component, material or functionality of the current collector assembly 100 depicted in FIG. 1. The insulative structure 125 can be coupled to the first portion 120, the second portion 135, the separator structure 720, voltage sense harness 805, a slot 810, and the battery cells 705. The single piece of the insulative structure 125 can reduce the number of conductor layers 105 in the current collector assembly 800. For example, since the insulative structure 125 is single piece, the conductor layer 105 can have various arrangements not constrained by the wielding of two pieces.

Figure 9:
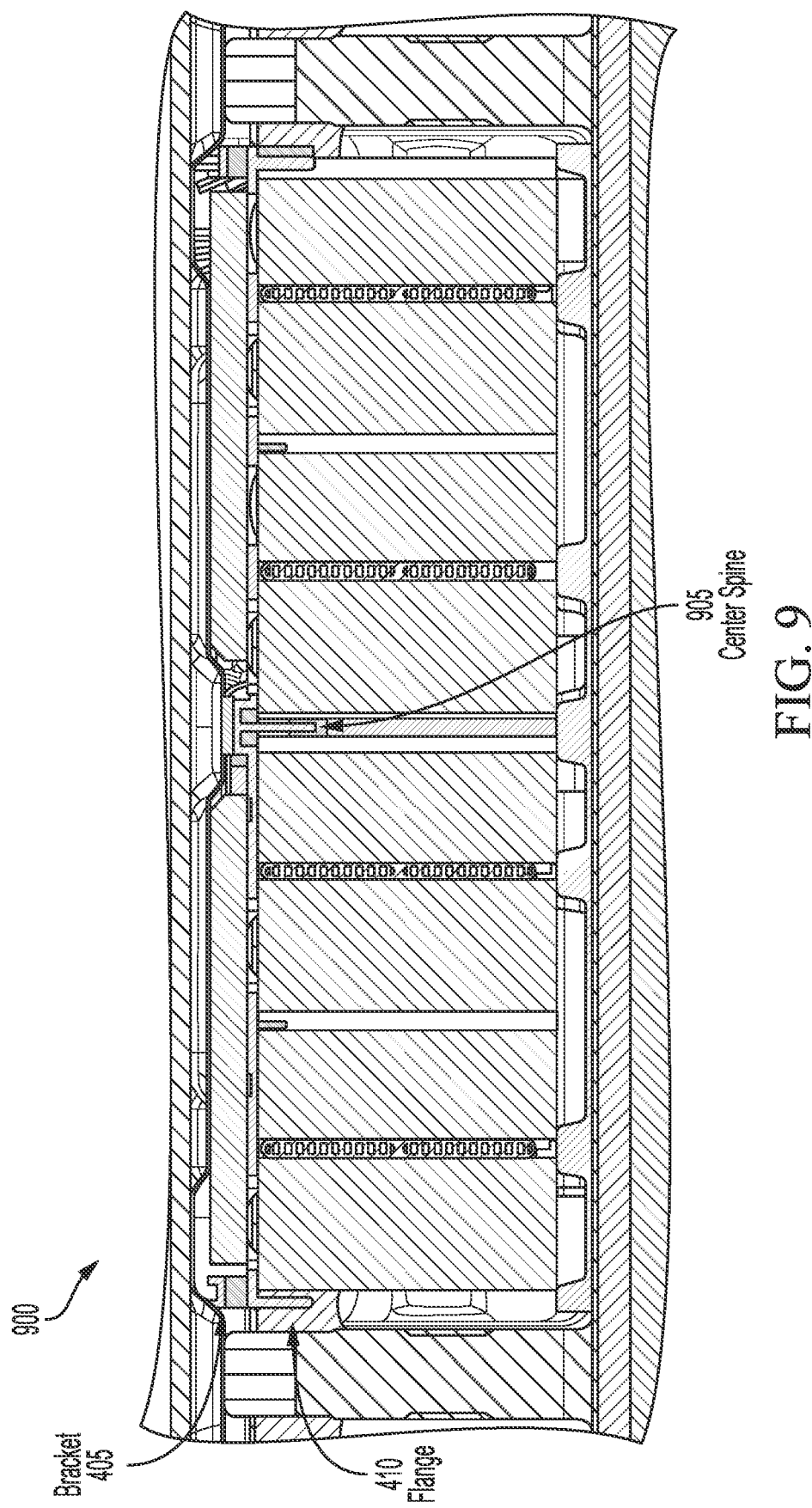
FIG. 9 depicts a side view of the current collector assembly.

FIG. 9 depicts a side view of a current collector assembly 900. The current collector assembly 900 can include one or more component, material or functionality of the current collector assembly 100 depicted in FIG. 1. The rib 115 can contain a center spine 905 coupled to a mechanical adhesive. The mechanical adhesive can be used to couple the lid to the current collector assembly 900. The center spine 905 can be the same material as the insulative structure 125 and can extend to the height of the battery cells 705. For example, the center spine 905 can be the same height at the battery cells 705 to maintain separation between the first and second group of battery cells 705. In some arrangements, the center spine 905 can be the same length as the rib 115. The center spine 905 can be used to locate the middle axis (e.g., Y axis 330). Furthermore, the center spine 905 can be used to align the flame barrier 715 and the battery cells 705 because it is disposed along the Y-Axis 330 to form a "center line" for the current collector assembly. The center spine 905 can allow for removal of portions of the insulative structure 125 to be relative to the center spine 905. For example, the center spice 905 can define a distance between the first and second groups of battery cells 705 to protect the battery cells 705.

Figure 10:
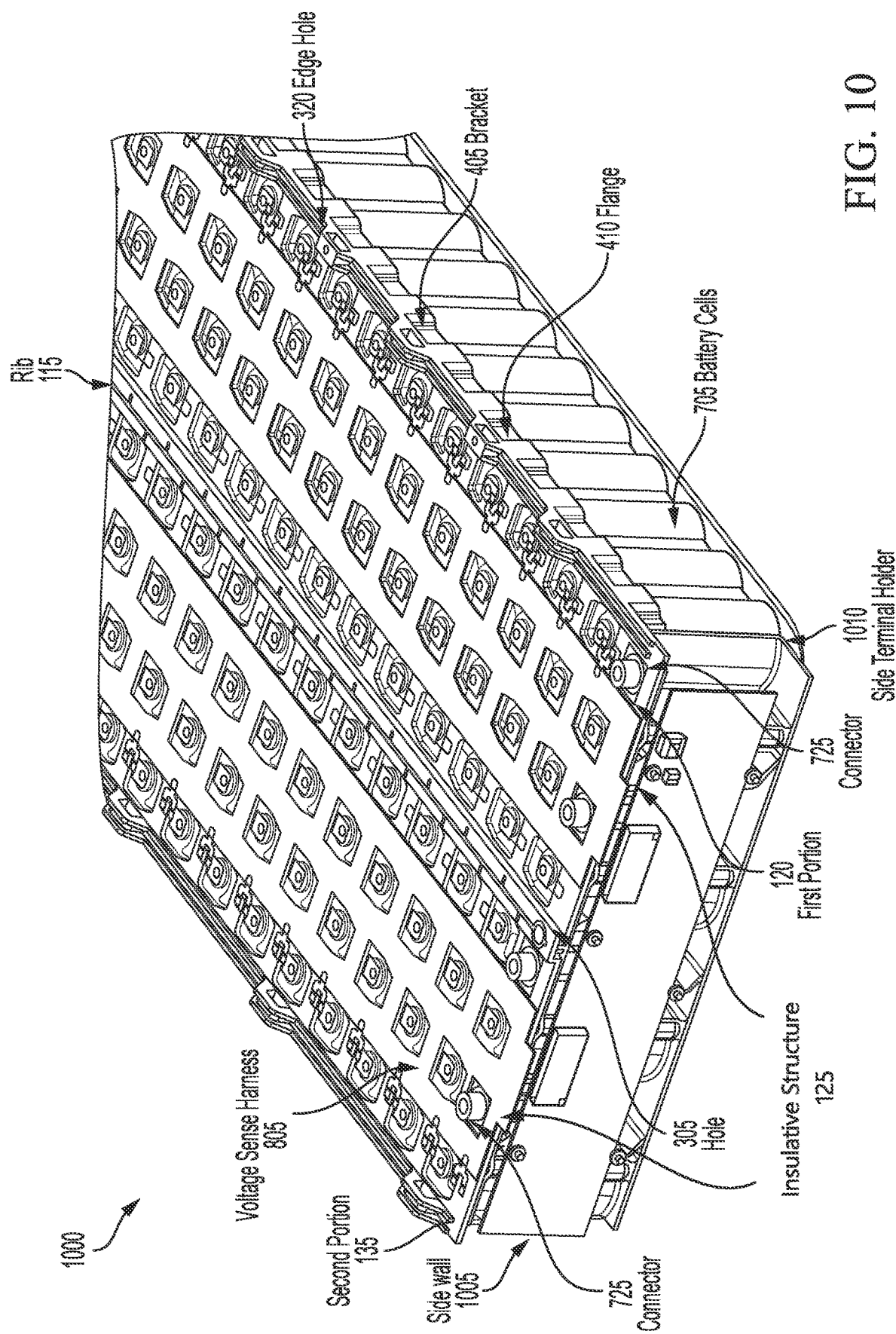
FIG. 10 depicts an example of the current collector assembly.

FIG. 10 depicts an example current collector assembly 1000. The current collector assembly 1000 can include one or more component, material or functionality of the current collector assembly 100 depicted in FIG. 1. The current collector assembly 1000 contains all components described herein. The insulative structure 125 can be formed by a trimming operation. The trimming operation can cut or remove excess material from a workpiece (e.g., plastic, metal, glass) The trimming operation can cut, remove or adjust material to form a desired shape, size or fit. Furthermore, the trimming operation can include finishing injection molded components to remove rough edges, flash, and excess material. For example, the trimming operation can cut a product to be a desired shape, and further can remove excess material from the product. By using the trimming operation, the flexibility of injection molding can be exploited to add geometry to the insulative structure 125. Therefore, identical insulative structured 125 can be formed with each use of the trimming operation.

The insulative structure 125 enables many components to be coupled, welded, places, or structured by the single piece of the insulative structure 125. The single piece enables the current collector assembly to have a single layer to house all the electrical components described herein (e.g., battery cells 705). The insulative structure 125 can define how other components are aligned to restrict the movement of the battery cells 705 (e.g., separator structure 720, conductor layer 105, or flame barrier 715). The current collector assembly can include a short wall 1005. The short wall 1005 can be used to protect the components of the current collector assembly 1000. For example, the short wall 1005 can protect the voltage sense harness 805, one or more terminals, and the battery cells 705. The first portion 120 and the second portion 135 can define the size and shape of the short wall 1005. Furthermore, the short wall 1005 can be coupled to a side terminal holder 1010. The side terminal holder 1010 can hold one or more terminals connected to the connectors 725. The side terminal holder 1010 can be a non-conductive material to prevent electrical current leakage.

The voltage sense harness 805 can be coupled to the top of the insulative structure 125 of the current collector assembly 100 or to the bottom of the insulative structure 125 within the current collector assembly 100. The voltage sense harness 805 can monitor the voltage at a critical point in an electrical system. For example, the voltage sense harness 805 can monitor the voltage of the battery cells 705. In some arrangements, the voltage sense harness 805 placed at the top of the current collector assembly 1000 can provide an accurate voltage measurement at a particular location on the current collector assembly. For example, the voltage sense harness 805 can measure the voltage of the battery cells 705 five rows from the positive connector 1015. In some arrangements, the voltage sense harness 805 can measure the voltage of the battery cells 705 seven rows from the positive connectors 1015.

Figure 11:
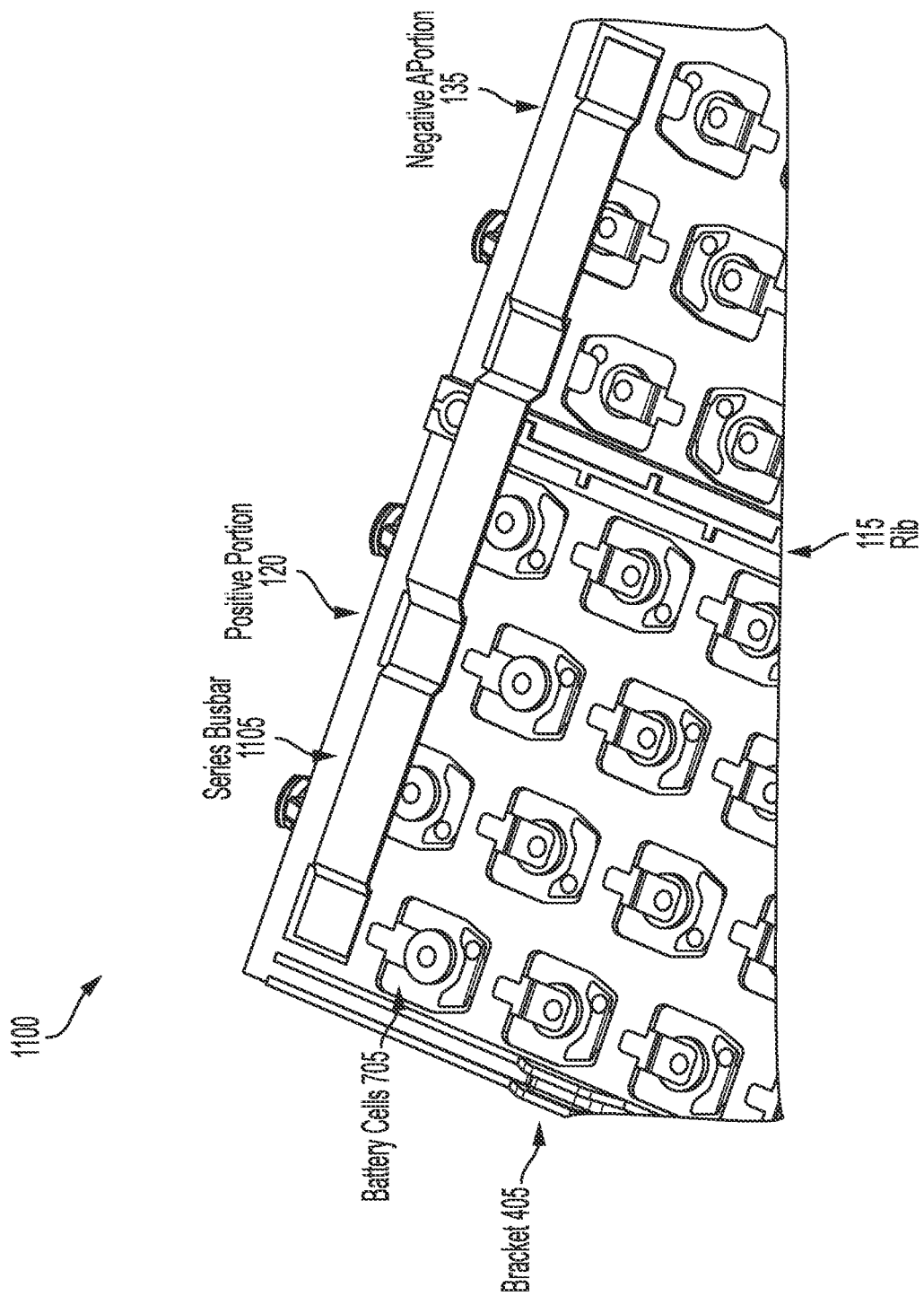
FIG. 11 depicts a top view of the current collector assembly.

FIG. 11 depicts an example top-side view current collector assembly 1100. The current collector assembly 1100 can include one or more component, material or functionality of the current collector assembly 100 depicted in FIG. 1. The current collector assembly 1100 can include one or more of the components described herein. For example, the current collector assembly 1100 can include a series busbar 1105 (referred to as first busbar 1105 herein) coupled to the positive portion 120 and the negative portion 135. The first busbar 1105 can include a metallic material but is not limited to copper and aluminum. The metallic material can depend on the characteristics of the current collector assembly 1000. For example, a first busbar 1105 can have an aluminum material to reduce the weight of the current collector assembly. In some arrangements, copper can be used due to the higher conductivity. In some arrangements, copper can be used to increase the longevity of the first busbar 1105. In some arrangements, the first busbar 1105 can have a structure proportional to the height of the rib 115. For example, if the rib 115 is 3.2 cm, the first busbar 1105 can have a displacement from the rib 115 of 4.2 cm.

The first busbar 1105 can maintain electrical current distribution in the current collector assembly 1000. For example, the first busbar 1105 can control the flow of current from the positive portion 120 to the negative portion 135. In some arrangements, the first busbar 1105 can interconnect the positive portion 120 and the negative portion 135. The first busbar 1105 can control voltage in the current collector assembly 1100 by ensuring that a desired voltage is transferring between the positive portion 120 and the negative portion 135. The desired voltage can be established by the voltage sense harness 805. For example, the first busbar 1105 can transfer electrical current between the positive portion 120 and the negative portion 135 based on measurements of the voltage sense harness 805.

The first busbar 1105 can be a centralized ground for the current collector assembly 1100. The metallic material of the first busbar 1105 can provide a low-impedance path for the current to flow to ground. For example, the first busbar 1105 can transfer the current from the battery cells 705 to ground by controlling the flow of current from the positive portion 120 to the negative portion 135. In some arrangements, the first busbar 1105 can protect the components of the current collector assembly 1100. For example, the first busbar 1105 can reduce the possibility of an occurrence of fault currents in the current collector assembly 1100.

Figure 12:
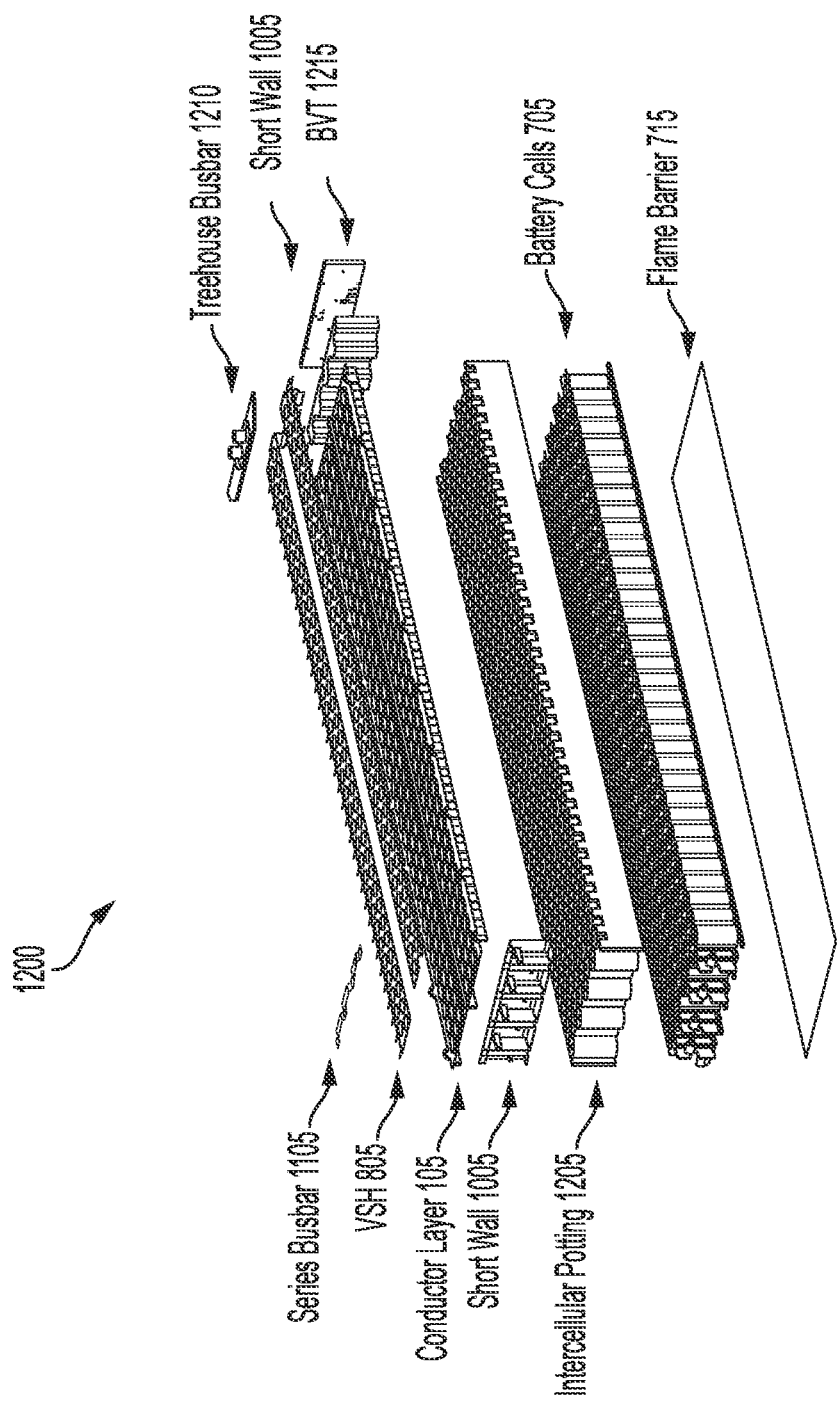
FIG. 12 depicts an exploded view of the current collector assembly.

FIG. 12 depicts an example exploded view of the current collector assembly 1200. The current collector assembly 1200 can include one or more component, material or functionality of the current collector assembly 100 depicted in FIG. 1. The current collector assembly 1200 contains all components described herein. The current collector assembly can include intercellular potting 1205, a treehouse busbar 1210, and a battery voltage tester 1215.

The intercellular potting 1205 can include a plurality of separator structures 720 described herein. The intercellular potting 1205 can hold a group of battery cells 705. The battery cells 705 can be part of a parallel group (such as parallel group configurations). The parallel group configurations can increase the total capacity of the battery system. The parallel group configurations can spread the current load across the battery cells 705. The battery cells 705 can be part of a group of cells. For example, the current collector assembly 1200 can include one separator structure 720 that holds one group of battery cells 705, two separator structures 720 that hold two groups of cells, three separator structures 720 that hold three groups of cells, or more.

The intercellular potting 1205 can comprise a material based on material properties such as thermal insulation or conductivity, structural strength, gravimetric density, ability to disperse heat, ability to resist combustion, or chemical resistance. For example, the material can be or include foam. The material can provide thermal management for the battery cells 705 in the current collector assembly 1200. The material can control or regulate the temperature of the battery cells 705 in the current collector assembly 1200. The material can insulate, dissipate, or redirect heat in the current collector assembly 1200. Thermal management can prevent overheating, thermal degradation, or thermal runaway. Thermal management can increase safety.

The second busbar 1210 (which can include or be referred to as a treehouse busbar 1210 herein) can include materials, structure, and functionality similar to the first busbar 1105. The second busbar 1210 can be coupled to the battery voltage tester 1215 and the voltage sense harness 805. The battery voltage tester 1215 can access the state of charge of the battery cells 705 and further determine whether the battery cells 705 have sufficient voltage to operate the current collector assembly 1200. For example, an interface can be couple to the battery voltage tester 1215 to display the state of charge of the battery cells 705. The battery voltage tester 1215 and the voltage sense harness 805 can work together to provide accurate voltage measurements of the battery cells 705 of a current collector assembly. For example, the voltage sense harness 805 can continuously monitor the voltage of each battery cell 705 in the battery cells 705. The real-time feedback can be transmitted to the battery voltage tester 1215 to provide the interface with a continuously updated measurement of the voltage of each battery cell 705 in the battery cells 705. The combination of the voltage sense harness 805 and the battery voltage tester 1215 can provide convenience of on-the-spot voltage checks and the benefits of automated, continuous monitoring to ensure optimal performance and prevent potential issues.

Figure 13:
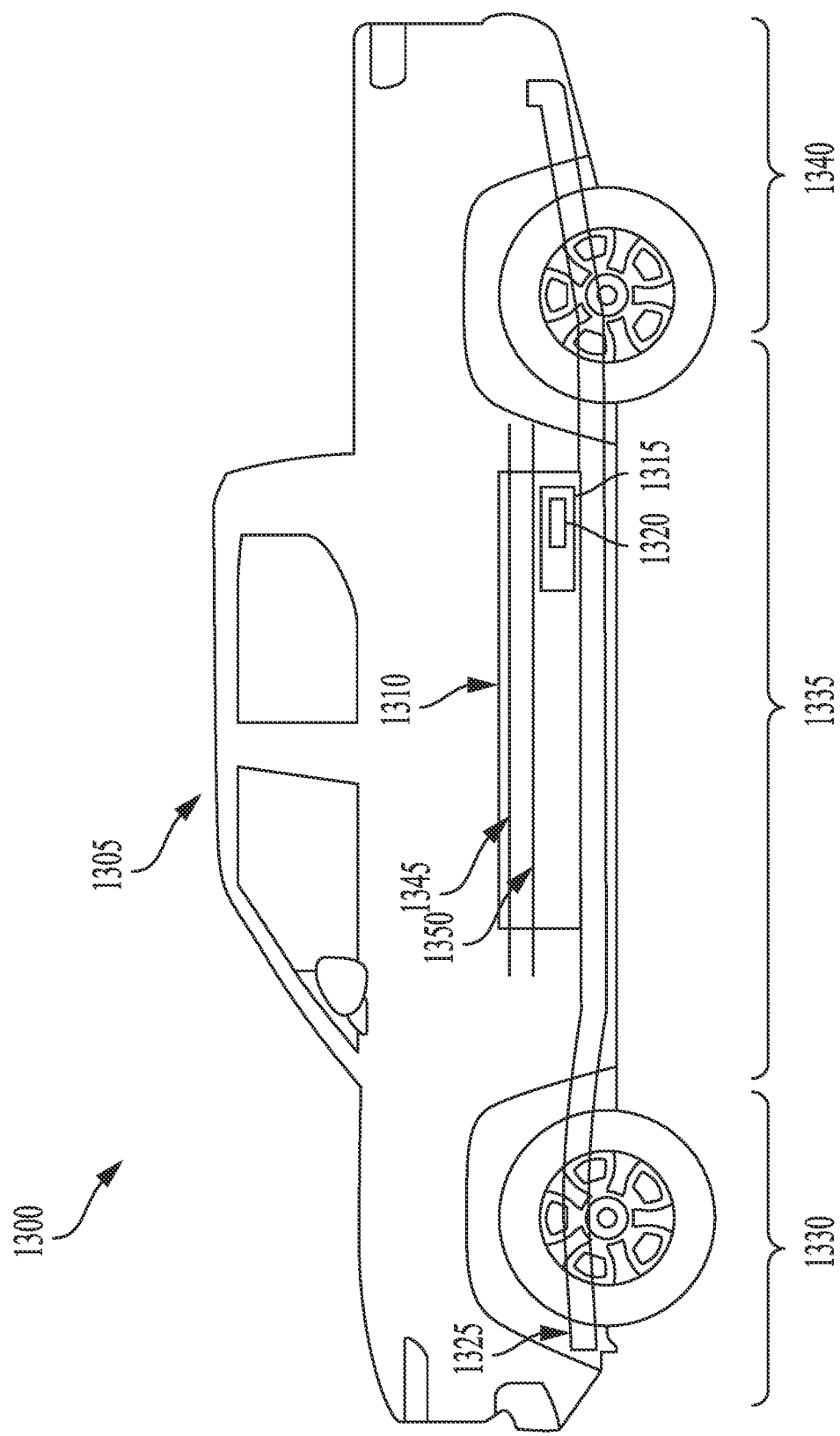
FIG. 13 depicts an example electric vehicle.

FIG. 13 depicts an example cross-sectional view 1300 of an electric vehicle 1305 installed with at least one battery pack 1310. Electric vehicles 1305 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 1310 can also be used as an energy storage system to power a building, such as a residential home or commercial building. Electric vehicles 1305 can be fully electric or partially electric (e.g., plug-in hybrid) and further, electric vehicles 1305 can be fully autonomous, partially autonomous, or unmanned. Electric vehicles 1305 can also be human operated or non-autonomous. Electric vehicles 1305 such as electric trucks or automobiles can include on-board battery packs 1310, battery modules 1315, or battery cells 1320 to power the electric vehicles. The electric vehicle 1305 can include a chassis 1325 (e.g., a frame, internal frame, or support structure). The chassis 1325 can support various components of the electric vehicle 1305. The chassis 1325 can span a front portion 1330 (e.g., a hood or bonnet portion), a body portion 1335, and a rear portion 1340 (e.g., a trunk, payload, or boot portion) of the electric vehicle 1305. The battery pack 1310 can be installed or placed within the electric vehicle 1305. For example, the battery pack 1310 can be installed on the chassis 1325 of the electric vehicle 1305 within one or more of the front portions 1330, the body portion 1335, or the rear portion 1340. The battery pack 1310 can include or connect with at least one busbar, e.g., a current collector element. The battery pack 1310 can include one or more component of the current collector assembly 100 depicted in FIG. 1. The first busbar 1345 and the second busbar 1350 can include electrically conductive material to connect or otherwise electrically couple the battery modules 1315 or the battery cells 1320 with other electrical components of the electric vehicle 1305 to provide electrical power to various systems or components of the electric vehicle 1305. The battery pack 1310 can connect with the current collector assembly 100. For example, the conductor layer 105 of the current collector assembly 100 can electrically couple the battery cells 1320 or the battery modules 1350 other electrical components of the electric vehicle 1305 to provide electrical power to various systems or components of the electric vehicle 1305.

Figure 14A:
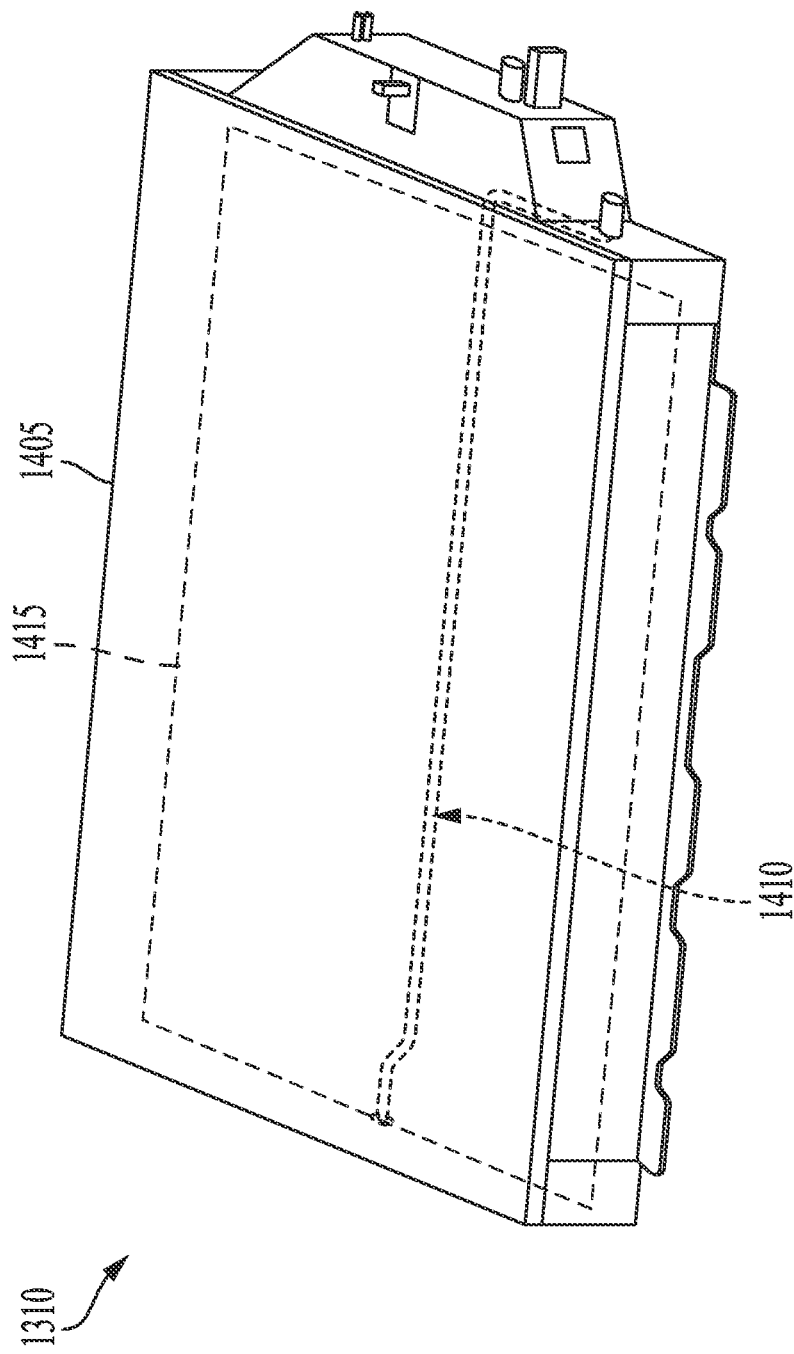
FIG. 14A depicts an example of one or more battery packs.

FIG. 14A depicts an example battery pack 1310. Referring to FIG. 14A, among others, the battery pack 1310 can provide power to electric vehicle 1305. Battery packs 1310 can include any arrangement or network of electrical, electronic, mechanical or electromechanical devices to power a vehicle of any type, such as the electric vehicle 1305. The battery pack 1310 can include at least one housing 1405. The housing 1405 can include at least one battery module 1315 or at least one battery cell 1320, as well as other battery pack components. The battery module 1315 can be or can include one or more groups of prismatic cells, cylindrical cells, pouch cells, or other form factors of battery cells 1320. The housing 1405 can include a shield on the bottom or underneath the battery module 1315 to protect the battery module 1315 and/or cells 1320 from external conditions, for example if the electric vehicle 1305 is driven over rough terrains (e.g., off-road, trenches, rocks, etc.) The battery pack 1310 can include at least one cooling line 1410 that can distribute fluid through the battery pack 1310 as part of a thermal/temperature control or heat exchange system that can also include at least one thermal component (e.g., cold plate) 1415. The thermal component 1415 can be positioned in relation to a top submodule and a bottom submodule, such as in between the top and bottom submodules, among other possibilities. The battery pack 1310 can include any number of thermal components 1415. For example, there can be one or more thermal components 1415 per battery pack 1310, or per battery module 1315. At least one cooling line 1410 can be coupled with, part of, or independent from the thermal component 1415.

Figure 14B:
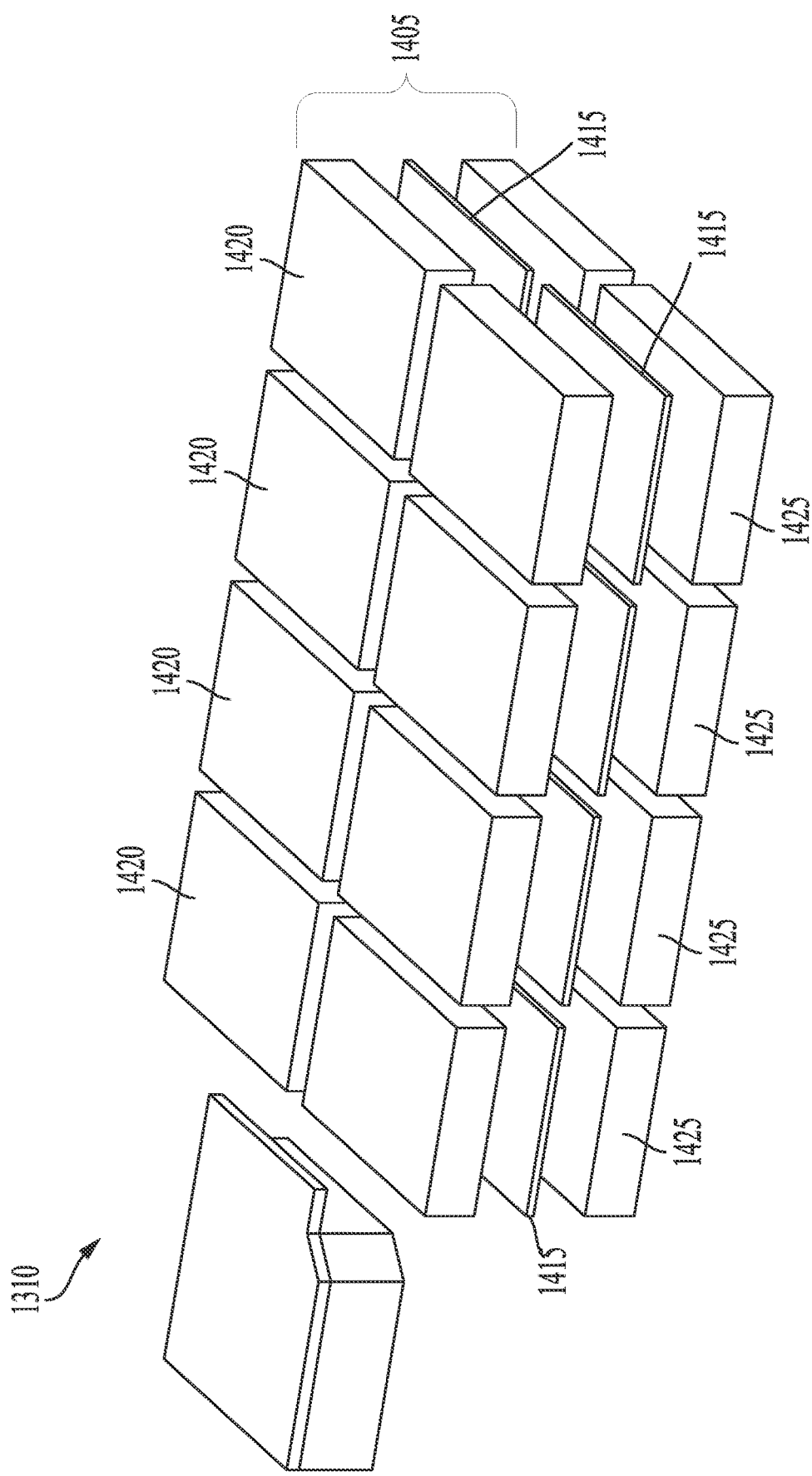
FIG. 14B depicts an example of one or more battery modules.
Figure 14C:
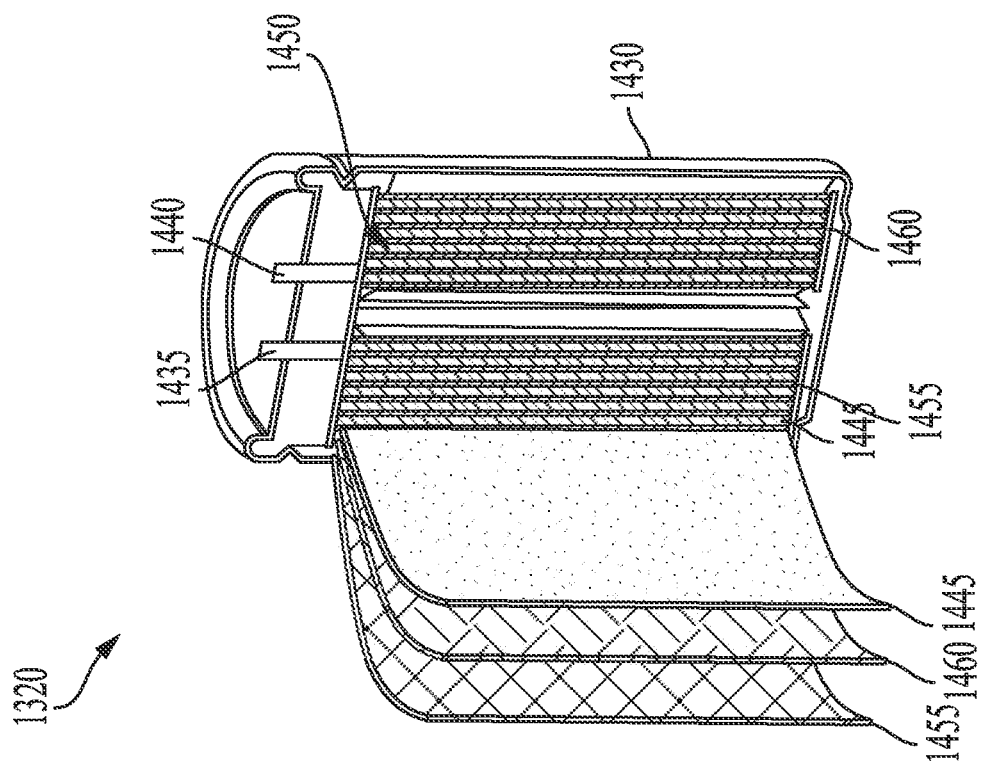
FIG. 14C depicts a cross sectional view of a battery cell.
Figure 14D:
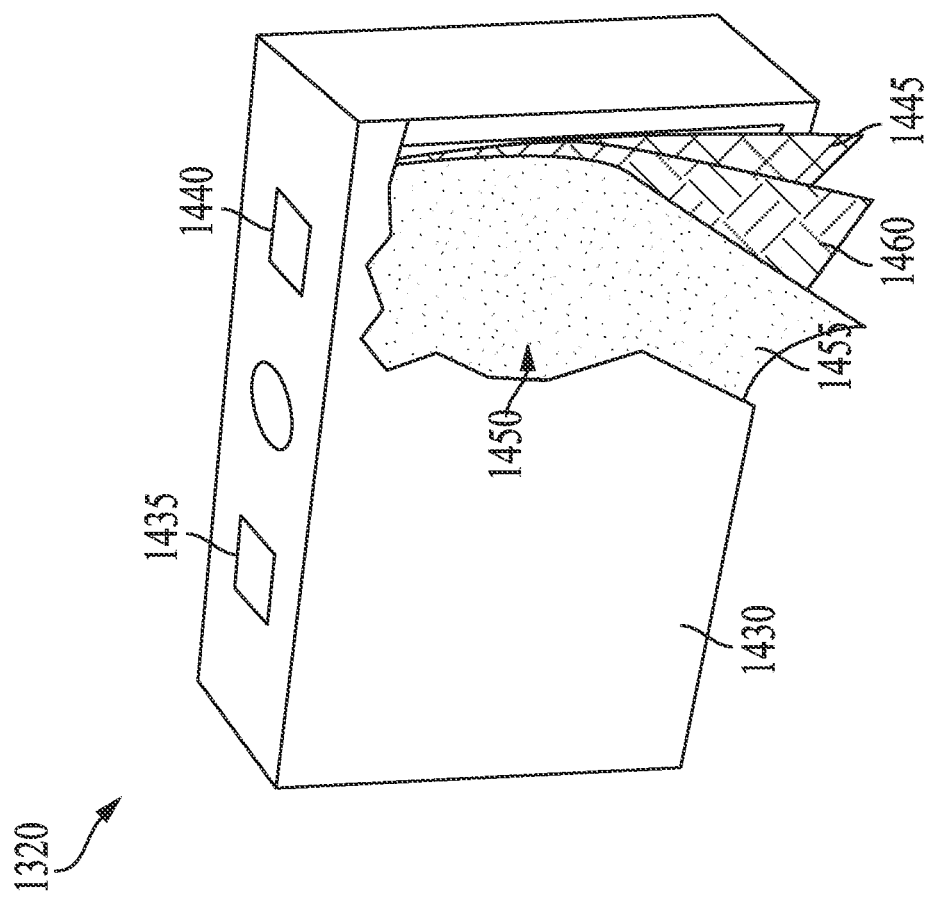
FIG. 14D depicts a cross sectional view of the battery cell.
Figure 14E:
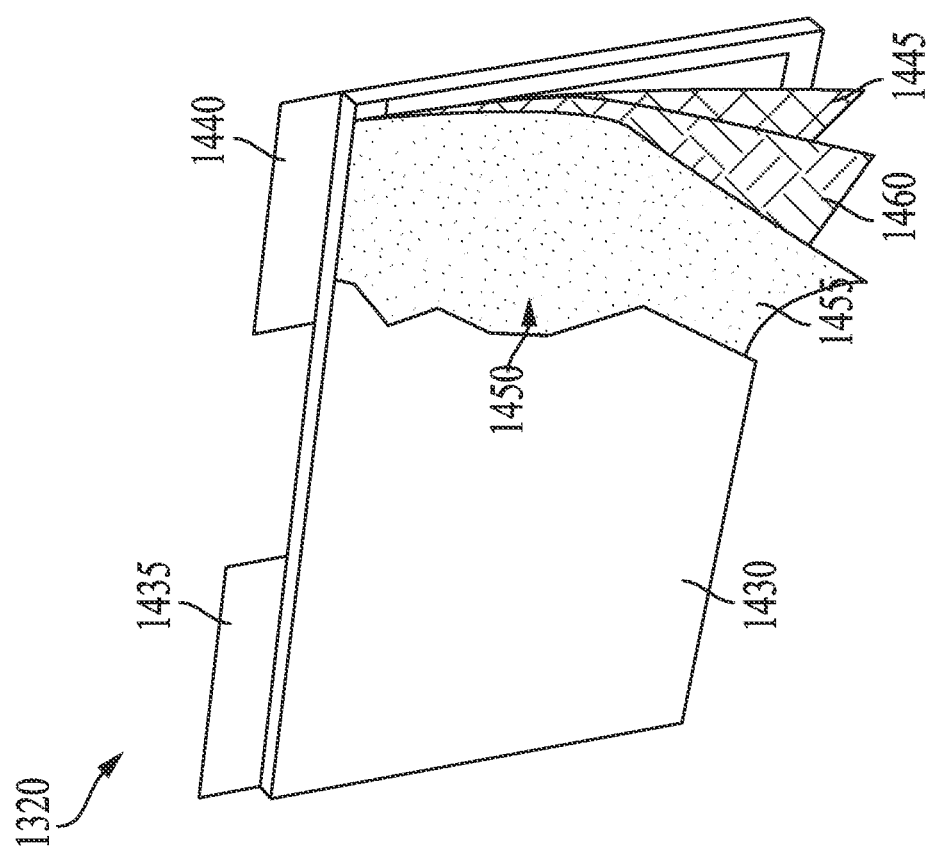
FIG. 14E depicts a cross sectional view of the battery cell.

FIG. 14B depicts example battery modules 1315, and FIGS. 14C, 14D and 14E depict an example cross sectional view of a battery cell 1320. The battery modules 1315 can include at least one submodule. For example, the battery modules 1315 can include at least one first (e.g., top) submodule 1420 or at least one second (e.g., bottom) submodule 1425. At least one thermal component 1415 can be disposed between the top submodule 1420 and the bottom submodule 1425. For example, one thermal component 1415 can be configured for heat exchange with one battery module 1315. The thermal component 1415 can be disposed or thermally coupled between the top submodule 1420 and the bottom submodule 1425. One thermal component 1415 can also be thermally coupled with more than one battery module 1315 (or more than two submodules 1420, 1425). The battery submodules 1420, 1425 can collectively form one battery module 1315. In some examples each submodule 1420, 1425 can be considered as a complete battery module 1315, rather than a submodule.

The battery modules 1315 can each include a plurality of battery cells 1320. The battery modules 1315 can be disposed within the housing 1255 of the battery pack 1310. The battery modules 1315 can include battery cells 1320 that are cylindrical cells or prismatic cells, for example. The battery module 1315 can operate as a modular unit of battery cells 1320. For example, a battery module 1315 can collect current or electrical power from the battery cells 1320 that are included in the battery module 1315 and can provide the current or electrical power as output from the battery pack 1310. The battery pack 1310 can include any number of battery modules 1315. For example, the battery pack can have one, two, three, four, five, six, seven, eight, nine, ten, eleven, twelve or other number of battery modules 1315 disposed in the housing 1255. It should also be noted that each battery module 1315 can include a top submodule 1420 and a bottom submodule 1425, possibly with a thermal component 1415 in between the top submodule 1420 and the bottom submodule 1425. The battery pack 1310 can include or define a plurality of areas for positioning of the battery module 1315 and/or cells 1320. The battery modules 1315 can be square, rectangular, circular, triangular, symmetrical, or asymmetrical. In some examples, battery modules 1315 can be different shapes, such that some battery modules 1315 are rectangular but other battery modules 1315 are square shaped, among other possibilities. The battery module 1315 can include or define a plurality of slots, holders, or containers for a plurality of battery cells 1320.

Battery cells 1320 have a variety of form factors, shapes, or sizes. For example, battery cells 1320 can have a cylindrical, rectangular, square, cubic, flat, pouch, elongated or prismatic form factor. As depicted in FIG. 14C, for example, the battery cell 1320 can be cylindrical. As depicted in FIG. 14D, for example, the battery cell 1320 can be prismatic. As depicted in FIG. 14E, for example, the battery cell 1320 can include a pouch form factor. Battery cells 1320 can be assembled, for example, by inserting a winded or stacked electrode roll (e.g., a jelly roll) including electrolyte material into at least one battery cell housing 1430. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 1320 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 1320. The housing 1430 can be of various shapes, including cylindrical or rectangular, for example. Electrical connections can be made between the electrolyte material and components of the battery cell 1320. For example, electrical connections to the electrodes with at least some of the electrolyte material can be formed at two points or areas of the battery cell 1320, for example to form a first polarity terminal 1435 (e.g., a positive or anode terminal) and a second polarity terminal 1440 (e.g., a negative or cathode terminal). The polarity terminals can be made from electrically conductive materials to carry electrical current from the battery cell 1320 to an electrical load, such as a component or system of the electric vehicle 1305.

For example, the battery cell 1320 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 1320 to separate the anode and cathode from each other and to facilitate transfer of lithium ions between the anode and cathode. It should be noted that battery cell 1320 can also take the form of a solid-state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., $Li_3PS_4$, $Li_7P_3S_{13}$, $Li_2S-P_2S_5$, $Li_2S-B_2S_3$, $SnS-P_2S_5$, $Li_2S-SiS_2$, $Li_2S-P_2S_5$, $Li_2S-GeS_2$, $Li_{10}GeP_2S_{14}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid-state electrolyte), for example, polyacrylonitrile (PAN), polyethylene oxide (PEO), polymethyl-methacrylate (PMMA), and polyvinylidene fluoride (PVDF), among others.

The battery cell 1320 can be included in battery modules 1315 or battery packs 1310 to power components of the electric vehicle 1305. The battery cell housing 1430 can be disposed in the battery module 1315, the battery pack 1310, or a battery array installed in the electric vehicle 1305. The housing 1430 can be of any shape, such as cylindrical with a circular (e.g., as depicted in FIG. 2C, among others), elliptical, or ovular base, among others. The shape of the housing 1430 can also be prismatic with a polygonal base, as shown in FIG. 2D, among others. As shown in FIG. 2E, among others, the housing 1430 can include a pouch form factor. The housing 1430 can include other form factors, such as a triangle, a square, a rectangle, a pentagon, and a hexagon, among others. In some embodiments, the battery pack can not include modules. For example, the battery pack can have a cell-to-pack configuration wherein battery cells are arranged directly into a battery pack without assembly into a module.

The housing 1430 of the battery cell 1320 can include one or more materials with various electrical conductivity or thermal conductivity, or a combination thereof. The electrically conductive and thermally conductive material for the housing 1430 of the battery cell 1320 can include a metallic material, such as aluminum, an aluminum alloy with copper, silicon, tin, magnesium, manganese, or zinc (e.g., aluminum 13000, 4000, or 5000 series), iron, an iron-carbon alloy (e.g., steel), silver, nickel, copper, and a copper alloy, among others. The electrically insulative and thermally conductive material for the housing 1430 of the battery cell 1320 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 1430 of the battery cell 1320 is prismatic (e.g., as depicted in FIG. 2D, among others) or cylindrical (e.g., as depicted in FIG. 2C, among others), the housing 1430 can include a rigid or semi-rigid material such that the housing 1430 is rigid or semi-rigid (e.g., not easily deformed or manipulated into another shape or form factor). In examples where the housing 1430 includes a pouch form factor (e.g., as depicted in FIG. 2E, among others), the housing 1430 can include a flexible, malleable, or non-rigid material such that the housing 1430 can be bent, deformed, manipulated into another form factor or shape.

The battery cell 1320 can include at least one anode layer 1445, which can be disposed within the cavity 1450 defined by the housing 1430. The anode layer 1445 can include a first redox potential. The anode layer 1445 can receive electrical current into the battery cell 1320 and output electrons during the operation of the battery cell 1320 (e.g., charging or discharging of the battery cell 1320). The anode layer 1445 can include an active substance. The active substance can include, for example, an activated carbon or a material infused with conductive materials (e.g., artificial or natural Graphite, or blended), lithium titanate ($Li_4Ti_5O_{14}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 1320 can include at least one cathode layer 1455 (e.g., a composite cathode layer compound cathode layer, a compound cathode, a composite cathode, or a cathode). The cathode layer 1455 can include a second redox potential that can be different than the first redox potential of the anode layer 1445. The cathode layer 1455 can be disposed within the cavity 1450. The cathode layer 1455 can output electrical current out from the battery cell 1320 and can receive electrons during the discharging of the battery cell 1320. The cathode layer 1455 can also release lithium ions during the discharging of the battery cell 1320. Conversely, the cathode layer 1455 can receive electrical current into the battery cell 1320 and can output electrons during the charging of the battery cell 1320. The cathode layer 1455 can receive lithium ions during the charging of the battery cell 1320.

The battery cell 1320 can include an electrolyte layer 1460 disposed within the cavity 1450. The electrolyte layer 1460 can be arranged between the anode layer 1445 and the cathode layer 1455 to separate the anode layer 1445 and the cathode layer 1455. The electrolyte layer 1460 can help transfer ions between the anode layer 1445 and the cathode layer 1455. The electrolyte layer 1460 can transfer $Li^+$ cations from the anode layer 1445 to the cathode layer 1455 during the discharge operation of the battery cell 1320. The electrolyte layer 1460 can transfer lithium ions from the cathode layer 1455 to the anode layer 1445 during the charge operation of the battery cell 1320.

The redox potential of layers (e.g., the first redox potential of the anode layer 1445 or the second redox potential of the cathode layer 1455) can vary based on a chemistry of the respective layer or a chemistry of the battery cell 1320. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 1455). Lithium-ion batteries can include a graphite chemistry, a silicon-graphite chemistry, or a lithium metal chemistry for the anode layer (e.g., the anode layer 1445).

For example, lithium-ion batteries can include an olivine phosphate (Li M PO4, M=Fe and/or Co and/or Mn and/or Ni)) chemistry, LISICON or NASICON Phosphates (Li3M2 (PO4) 3 and LiMPO4Ox, M=Ti, V, Mn, Cr, and Zr), for example Lithium iron phosphate (LFP), Lithium iron manganese phosphate (LMFP), a layered oxides (LiMO2, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides (Li1+xM1−xO2) (Ni, and/or Mn, and/or Co), (OLO or LMR), spinel (LiMn2O4) and high voltage spinels (LiMn1.5Ni0.5O4), disordered rock salt, Fluorophosphates Li2FePO4F (M=Fe, Co, Ni) and Fluorosulfates LiMSO4F (M=Co, Ni, Mn) (e.g., the cathode layer 1455). Lithium-ion batteries can include a graphite chemistry, a silicon-graphite chemistry, or a lithium metal chemistry for the anode layer (e.g., the anode layer 1445). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 1455) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 1445) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidene fluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly (3,4-ethylenedioxythiophene) polystyrene sulfonate (PEDOT-PSS), polyacrylic acid (PAA), poly(methyl acrylate) (PMA), poly (vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 1460 can include or be made of a liquid electrolyte material. For example, the electrolyte layer 1460 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 1460 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 1460 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{13}$, $Li_2S$—$P_2S_5$, $Li_2S$-$B_2S_3$, SnS—$P_2S_5$, $Li_2S$—$SiS_2$, $Li_2S$—$P_2S_5$, $Li_2S$—$GeS_2$, $Li_{10}GeP_2S_{14}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid-state electrolyte), for example, polyacrylonitrile (PAN), polyethylene oxide (PEO), polymethyl-methacrylate (PMMA), and polyvinylidene fluoride (PVDF), among others.

In examples where the electrolyte layer 1460 includes a liquid electrolyte material, the electrolyte layer 1460 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 1460 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 1460 can include a lithium salt material. For example, the lithium salt can be lithium perchlorate, lithium hexafluorophosphate, lithium bis(fluorosulfonyl) imide, lithium bis(trifluorosulfonyl) imide, or a mixture of any two or more thereof. The lithium salt can be present in the electrolyte layer 1460 from greater than 0 M to about 1.5 M.

Figure 15:
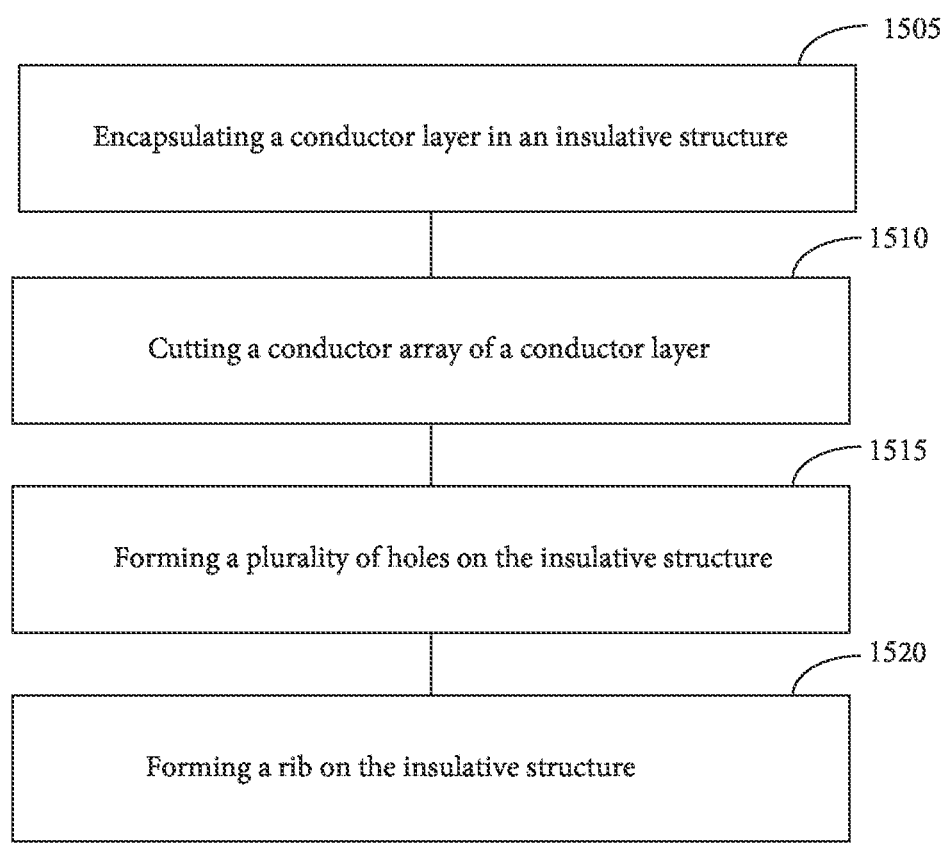
FIG. 15 is a flow diagram illustrating an example method of forming the current collector assembly.

FIG. 15 depicts a method 1500 to form, create, build, or manufacture a current collector assembly using an insulative structure (e.g., a single piece of insulative structure material, such as plastic, insulative structure 125). The method 1500 can be performed by, using, or for a system 1000, a battery pack 1310 or an EV 1305. At ACT 1505, the method 1500 can include encapsulating a conductor layer in the insulative structure. At ACT 1510, the method 1500 can include cutting a conductor array of the conductor layer. At ACT 1515, the method 1500 can include forming a plurality of holes from the insulative structure. At ACT 1520, the method can include forming a rib on the insulative structure.

At ATC 1505, the method 1500 can include at least partially encapsulating a conductor layer in the insulative structure. The conductor layer can be made of aluminum, copper, tin, or any other conductive material. The method 1500 can include forming the insulative structure as an overmold to attenuate a frequency of vibration to restrict movement the current collector assembly.

At ACT 1510, the method 1500 can include cutting a conductor array of a conductor layer, a first portion of the conductor array to contact a positive terminal of a first group of battery cells, and a second portion of the conductor array to contact a negative terminal of a second group of battery cells. The method 1500 can include forming a plurality of cell spaces within the conductor array. The method 1500 can include aligning the plurality of cell spaces with openings in the insulative structure. The plurality of cell spaces can have a shape that is polygonal. The method 1500 can include forming an insulative structure by a trimming operation. The trimming operation involves using an injection molding machine to formulate the geometry of the insulative structure. The conductor layer can include a material to conduct electricity (e.g., gold, copper, aluminum, silver, combination of metallic metals). The materials have high density of free electrons to transmit current. The conductor can be formed by depositing the material onto a substrate following a process including at least one of physical vapor deposition, chemical vapor deposition, electroplating, chemical deposition, among others. The method 1500 can include removing portions of the conductor layer to create space for a plurality of battery cells. The battery cells can include one or more materials with various electrical conductivity or thermal conductivity, or a combination thereof. The electrically conductive and thermally conductive material for a housing of the plurality of battery cells can include a metallic material, such as aluminum, an aluminum alloy with copper, silicon, tin, magnesium, manganese, or zinc (e.g., aluminum 13000, 4000, or 5000 series). The conductor array can include a pattern of conductive materials on the substrate. The pattern of conductive materials can facilitate the flow of electrical current based on the conductor layer. In some arrangements, the conductive array can detect changes in temperature, current, or voltage and provide the changes to a voltage sensing harness. The conductor array can be stamped in the insulative structure to connect to each battery cell in a plurality of battery cells.

At ACT 1515, the method 1500 can include forming a first plurality of holes in the insulative structure on a second side of the current collector assembly that is opposite the side of the current collector assembly with the rib. The method 1500 can include aligning, the first plurality of holes with a second plurality of holes on a lower insulation barrier of the current collector assembly. The method 1500 can include forming a flange on the insulative structure. The flange is disposed along the first portion and the second portion of the insulative structure. The method 1500 can include aligning, by the flange, the insulative structure with a first row of battery cells in the first group of battery cells and a second row of battery cells in the second group of battery cells within the current collector assembly. The method 1500 can include constraining, by the flange, movement of the first row of battery and the second row of battery cells within the current collector assembly. The method 1500 can include attaching a voltage sense harness to a first side of the insulative structure, wherein side of the insulative structure is the first side. The method 1500 can include connecting the voltage sense harness to the first group of battery cells and the second group of battery cells.

At ACT 1520, the method 1500 can include forming, a rib from the insulative structure, on a second side of the current collector assembly opposite the first side. The method 1500 can include forming a spine on the insulative structure. The spine can be connected to the rib. The method 1500 can include aligning, by the spine, the first group of battery cells and the second group of battery cells along the first portion and the second portion of the insulative structure. The method 1500 can include forming a plurality of brackets along the first portion and the second portion of the insulative structure. The method 1500 can include aligning by the plurality of brackets, the current collector assembly within the battery system. The method 1500 can include connecting one or more busbars to the first portion of the conductor array and the second portion of the conductor array. The method 1500 can include transferring, by the one or more busbars, current between the first portion of the conductor array and the second portion of the conductor array. The method 1500 can include the injection molding machine inspecting the insulative structure for defects and fixing any defects in the insulative structure using the trimming operation.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "contained" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all the described terms. References to at least one of a conjunctive list of terms can be construed as an inclusive OR to indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics can be reversed. For example, negative busbar and a positive busbar can be reversed, as well as negative current collector and the positive current collector. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery system comprising:
   a current collector assembly formed from an insulative structure, comprising:
   a conductor layer at least partially encapsulated by the insulative structure;
   a conductor array of the conductor layer, a first portion of the conductor array to contact a positive terminal of a first group of battery cells, and a second portion of the conductor array to contact a negative terminal of a second group of battery cells;

a rib formed from the insulative structure of the current collector assembly;

a first plurality of holes in the insulative structure on a first side of the current collector assembly that is opposite a second side of the current collector assembly with the rib;

a lower insulation barrier of the current collector assembly, the lower insulation barrier comprising a second plurality of holes configured to align with the first plurality of holes on the second side of the current collector assembly, wherein at least one of the first side or the second side of the insulative structure is configured to attach to an electrical component, the electrical component to connect to the first group of battery cells and the second group of battery cells; and a spine, connected to the rib, the spine configured to separate the first group of battery cells from the second group of battery cells within the current collector assembly.

2. The battery system of claim 1, wherein the conductor array comprises a plurality of cell spaces aligned with openings in the insulative structure, wherein the plurality of cell spaces have a shape that is polygonal.

3. The battery system of claim 1, wherein the insulative structure comprises a flange disposed along the first portion and the second portion of the insulative structure, the flange configured to:

align the insulative structure with a first row of battery cells in the first group of battery cells and a second row of battery cells in the second group of battery cells; and constrain movement of the first row of battery cells within the first group of battery cells and the second row of battery cells within the second group of battery cells.

4. The battery system of claim 1, further comprising:

the spine configured to align the first group of battery cells and the second group of battery cells along the first portion and the second portion of the insulative structure.

5. The battery system of claim 1, wherein the insulative structure further comprises a plurality of brackets along the first portion and the second portion of the insulative structure, the plurality of brackets configured to align the current collector assembly within the battery system.

6. The battery system of claim 1, comprising:

one or more busbars in contact with the first portion of the conductor array and the second portion of the conductor array, wherein the one or more busbars are configured to transfer current between the first portion of the conductor array and the second portion of the conductor array.

7. The battery system of claim 1, wherein the insulative structure comprises an overmold configured to attenuate a frequency of vibration to restrict movement of the current collector assembly.

8. A method comprising:

forming a current collector assembly from an insulative structure;

at least partially encapsulating a conductor layer within the insulative structure;

cutting a conductor array of the conductor layer, a first portion of the conductor array to contact a positive terminal of a first group of battery cells, and a second portion of the conductor array to contact a negative terminal of a second group of battery cells;

forming a first plurality of holes in the insulative structure on a second side of the current collector assembly that is opposite the side of the current collector assembly with the rib;

aligning the first plurality of holes with a second plurality of holes on a lower insulation barrier of the current collector assembly;

attaching an electrical component to at least one of a first side or a second side of the insulative structure, wherein the second side is opposite the first side;

connecting the electrical component to the first group of battery cells and the second group of battery cells;

forming a rib on the insulative structure of the current collector assembly; and forming a spine that is connected to the rib, the spine to separate the first group of battery cells from the second group of battery cells within the current collector assembly.

9. The method of claim 8, comprising:

forming a plurality of cell spaces within the conductor array; and aligning, the plurality of cell spaces with openings in the insulative structure, wherein the plurality of cell spaces have a shape that is polygonal.

10. The method of claim 8, comprising:

forming a flange on the insulative structure, wherein the flange is disposed along the first portion and the second portion of the insulative structure;

aligning, by the flange, the insulative structure with a first row of battery cells in the first group of battery cells and a second row of battery cells in the second group of battery cells within the current collector assembly; and constraining, by the flange, movement of the first row of battery and the second row of battery cells within the current collector assembly.

11. The method of claim 8, comprising:

aligning, by the spine, the first group of battery cells and the second group of battery cells along the first portion and the second portion of the insulative structure.

12. The method of claim 8, comprising:

forming a plurality of brackets along the first portion and the second portion of the insulative structure; and aligning, by the plurality of brackets, the current collector assembly within the battery system.

13. The method of claim 8, comprising:

connecting one or more busbars to the first portion of the conductor array and to the second portion of the conductor array; and transferring, by the one or more busbars, current between the first portion of the conductor array and the second portion of the conductor array.

14. The method of claim 8, comprising:

forming the insulative structure as an overmold attenuate a frequency of vibration to restrict movement of the current collector assembly.

15. An electric vehicle comprising:

a battery system comprising:

a current collector assembly formed from an insulative structure, comprising:

a conductor layer encapsulated by the insulative structure;

a conductor array of the conductor layer, a first portion of the conductor array to contact a positive terminal of a first group of battery cells, and a second portion of the conductor array to contact a negative terminal of a second group of battery cells;

a rib formed from the insulative structure of the current collector assembly;

a first plurality of holes in the insulative structure on a first side of the current collector assembly that is opposite a second side of the current collector assembly with the rib;

a lower insulation barrier of the current collector assembly, the lower insulation barrier comprising a second plurality of holes configured to align with the first plurality of holes on the second side of the current collector assembly, wherein at least one of the first side or the second side of the insulative structure is configured to attach to an electrical component, the electrical component to connect to the first group of battery cells and the second group of battery cells; and a spine, connected to the rib, the spine configured to separate the first group of battery cells from the second group of battery cells within the current collector assembly.

16. The electric vehicle of claim 15, wherein at least one of a first side or a second side of the insulative structure is configured to attach to a voltage sense harness, the voltage sense harness to connect to the first group of battery cells and the second group of battery cells.

17. The battery system of claim 1, wherein the electrical component comprises a voltage sense harness and a battery voltage tester, the voltage sense harness to connect to the first group of battery cells and the second group of battery cells.

18. The battery system of claim 1, wherein the insulative structure comprises a first busbar coupled to a positive portion of the first group of battery cells and a negative portion of the second group of battery cells.

* * * * *